United States Patent
Liu et al.

(10) Patent No.: US 10,454,718 B2
(45) Date of Patent: Oct. 22, 2019

(54) METHODS USED IN CONTROL NODE AND SERVING RADIO NODE, AND ASSOCIATED DEVICES

(71) Applicant: Telefonaktiebolaget LM Ericsson (publ), Stockholm (SE)

(72) Inventors: Jinhua Liu, Beijing (CN); Gen Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 147 days.

(21) Appl. No.: 15/509,317

(22) PCT Filed: May 31, 2016

(86) PCT No.: PCT/CN2016/084032
§ 371 (c)(1),
(2) Date: Mar. 7, 2017

(87) PCT Pub. No.: WO2016/206525
PCT Pub. Date: Dec. 29, 2016

(65) Prior Publication Data
US 2017/0279641 A1   Sep. 28, 2017

(30) Foreign Application Priority Data

Jun. 26, 2015 (WO) ............... PCT/CN2015/082500
Jun. 26, 2015 (WO) ............... PCT/CN2015/082516
Jun. 26, 2015 (WO) ............... PCT/CN2015/082519

(51) Int. Cl.
*H04L 25/02* (2006.01)
*H04B 7/06* (2006.01)
(Continued)

(52) U.S. Cl.
CPC ......... *H04L 25/0226* (2013.01); *H04B 7/024* (2013.01); *H04B 7/04* (2013.01);
(Continued)

(58) Field of Classification Search
None
See application file for complete search history.

(56) References Cited

U.S. PATENT DOCUMENTS

2007/0046539 A1* 3/2007 Mani ................. H01Q 3/26
342/383
2008/0268857 A1   10/2008 McCoy et al.
(Continued)

FOREIGN PATENT DOCUMENTS

| CN | 101784116 | 7/2010 |
|---|---|---|
| CN | 102624465 | 8/2012 |
| WO | WO 2014161593 | 10/2014 |

OTHER PUBLICATIONS

PCT Notification of Transmittal of the International Search Report and the Written Opinion of the International Searching Authority, or the Declaration for International application No. PCT/CN2016/084032—dated Aug. 24, 2016.
(Continued)

*Primary Examiner* — Steve R Young
(74) *Attorney, Agent, or Firm* — Baker Botts, LLP

(57) ABSTRACT

The present disclosure discloses a method used in a control node and an associated control node. The control node controls a serving radio node in a wireless communication network and the serving radio node serves one or more client radio nodes which are connected to the serving radio node via one or more links. The method includes determining to apply a sounding and sensing related configuration for the serving radio node in each link of the one or more links, if at least one link related parameter of the link satisfies a first predefined condition; and transmitting an enablement signal to the serving radio node, the enablement signal indicating enabling application of the sounding and sensing related configuration in the link. The present disclosure further discloses a method used in a serving radio node under
(Continued)

control of a control node and an associated serving radio node. Moreover, the present disclosure discloses another method used in a control node and an associated control node.

26 Claims, 16 Drawing Sheets

(51) Int. Cl.
| | |
|---|---|
| H04W 16/10 | (2009.01) |
| H04W 72/04 | (2009.01) |
| H04B 7/024 | (2017.01) |
| H04B 7/04 | (2017.01) |
| H04L 5/00 | (2006.01) |
| H04W 24/10 | (2009.01) |
| H04W 72/08 | (2009.01) |
| H04L 27/00 | (2006.01) |
| H04W 84/12 | (2009.01) |
| H04L 1/00 | (2006.01) |

(52) U.S. Cl.
CPC ......... *H04B 7/0617* (2013.01); *H04L 5/0032* (2013.01); *H04L 5/0048* (2013.01); *H04L 5/0051* (2013.01); *H04L 5/0053* (2013.01); *H04L 5/0091* (2013.01); *H04L 27/0006* (2013.01); *H04W 16/10* (2013.01); *H04W 24/10* (2013.01); *H04W 72/046* (2013.01); *H04W 72/082* (2013.01); *H04L 1/0079* (2013.01); *H04W 84/12* (2013.01)

(56) References Cited

U.S. PATENT DOCUMENTS

| | | | |
|---|---|---|---|
| 2009/0097395 A1* | 4/2009 | Zhang | H04B 7/0417 |
| | | | 370/203 |
| 2010/0222003 A1 | 9/2010 | Yoshii et al. | |
| 2011/0143763 A1 | 6/2011 | Kim | |
| 2012/0139788 A1* | 6/2012 | Gianinni | H01Q 1/007 |
| | | | 342/372 |
| 2013/0107798 A1* | 5/2013 | Gao | H04W 72/1226 |
| | | | 370/328 |
| 2014/0062784 A1* | 3/2014 | Rison | H04B 7/086 |
| | | | 342/368 |
| 2014/0187174 A1* | 7/2014 | Safavi | H04B 7/0413 |
| | | | 455/73 |
| 2014/0241242 A1* | 8/2014 | Josiam | H04W 88/02 |
| | | | 370/328 |
| 2016/0029407 A1* | 1/2016 | Soldati | H04W 52/0206 |
| | | | 370/329 |
| 2016/0094358 A1 | 3/2016 | Won et al. | |
| 2016/0295502 A1* | 10/2016 | Yoon | H04W 52/0229 |
| 2017/0288746 A1 | 10/2017 | Strong | |
| 2017/0303314 A1* | 10/2017 | Cariou | H04W 74/0808 |
| 2017/0347281 A1* | 11/2017 | Liu | H04L 5/0048 |
| 2018/0139017 A1* | 5/2018 | Chen | H04L 5/0035 |

OTHER PUBLICATIONS

EPO issued Extended European Search Report for Application No./Patent No. 18613641.4-1219/3314937 PCT/CN2016084032—dated Jan. 21, 2019.

* cited by examiner

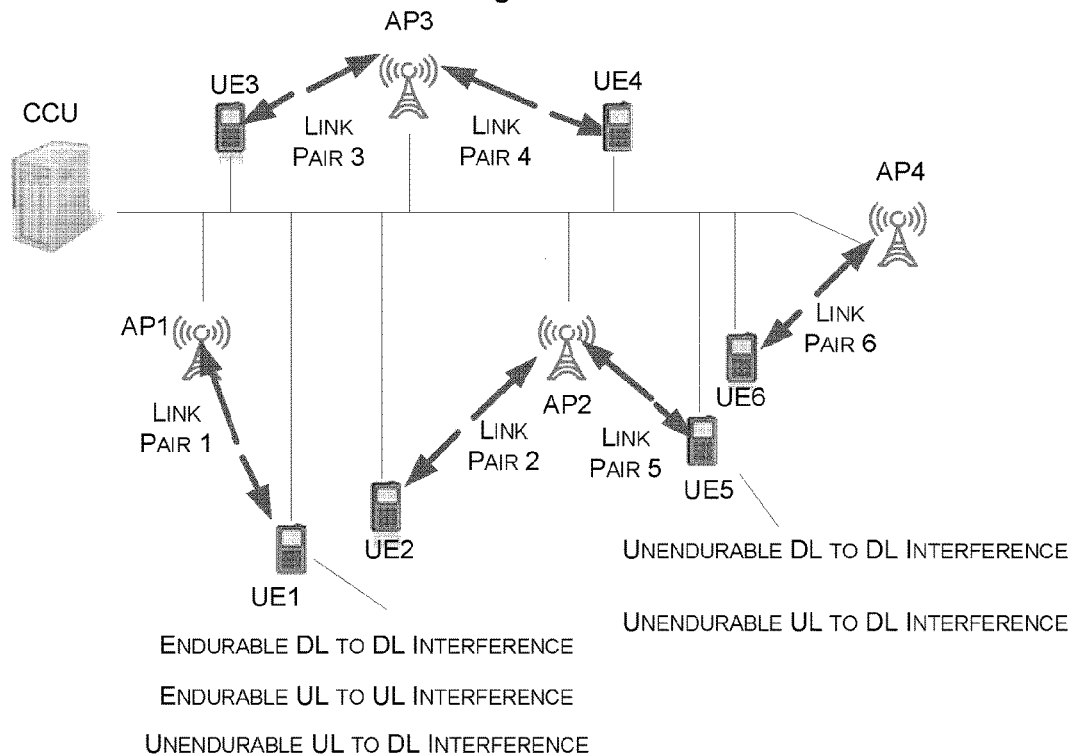
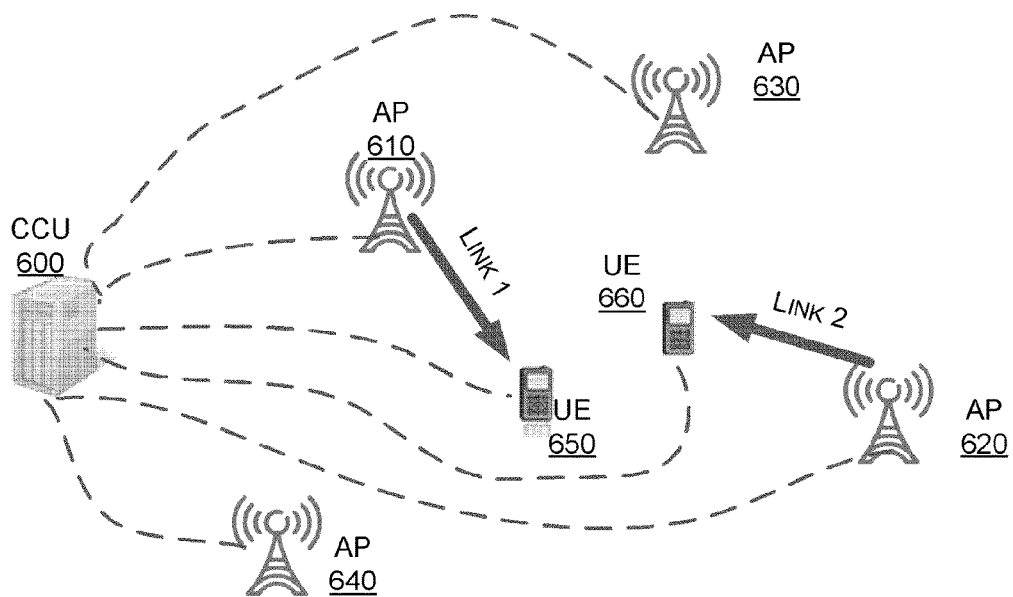

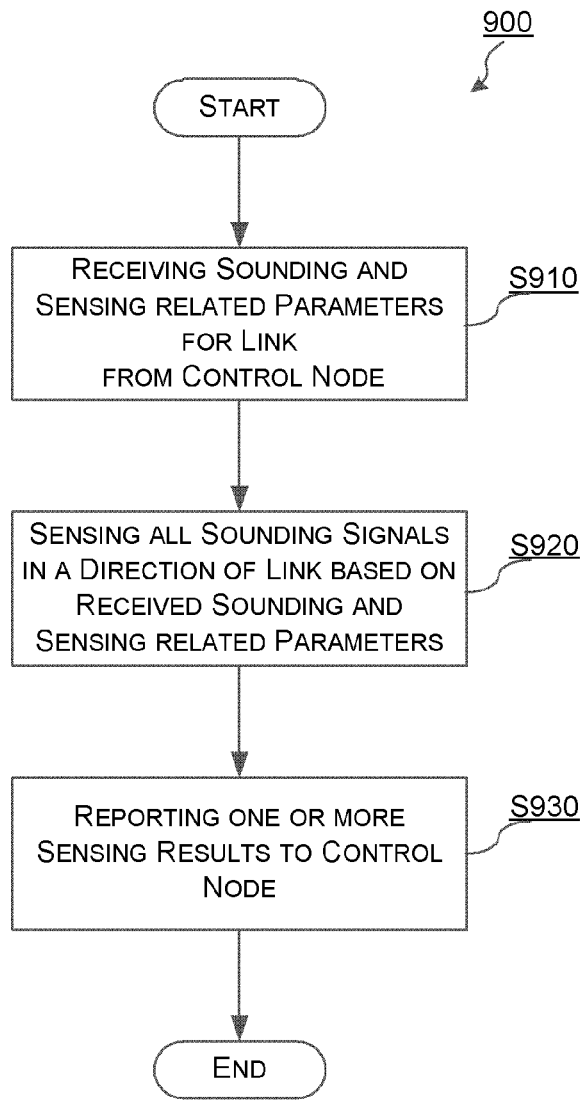
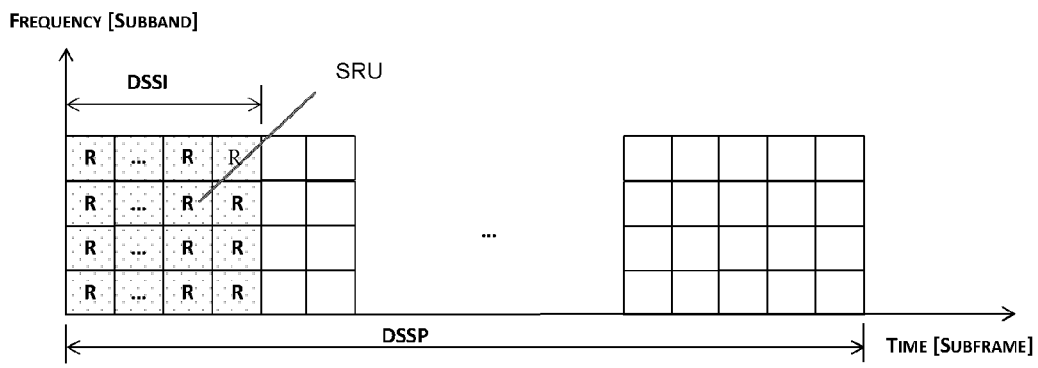

METHODS USED IN CONTROL NODE AND SERVING RADIO NODE, AND ASSOCIATED DEVICES

PRIORITY

This nonprovisional application is a U.S. National Stage Filing under 35 U.S.C. § 371 of International Patent Application Ser. No. PCT/CN2016/084032 filed May 31, 2016, and entitled "Methods Used In Control Node And Serving Radio Node, And Associated Devices" which claims priority to PCT/CN2015/082500 filed Jun. 26, 2015; PCT/CN2015/082516 filed Jun. 26, 2015 and PCT/CN2015/082519 filed Jun. 26, 2015.

TECHNICAL FIELD

The technology presented in this disclosure generally relates to the technical field of wireless communication networks. More particularly, the present disclosure relates to methods used in a control node controlling a serving radio node and the associated control node, and to a method used in a serving radio node and the associated serving radio node.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Currently, wireless communication networks or systems, such as MilliMeter-Wave (MMW) wireless systems, operating at high frequencies from 30-300 GHz, are emerging as a promising technology to meet exploding bandwidth requirements by enabling multi-Gb/s speeds. For example, the 5th Generation (5G) network is likely to be a combination of evolved 3rd Generation (3G) technologies, the 4th Generation (4G) technologies and emerging or substantially new components such as Ultra-Density Network (UDN), which is also referred to as MMW Radio Access Technology (RAT). At such high frequencies, a large number of antennas can be available at a transmitter, a receiver, or both. In order to make up for the large propagation loss that typically occurs, beam-forming becomes a very important feature in MMW wireless systems.

Beam-forming is a signal processing technique used for directional signal transmission and/or reception. For Transmitter (TX) beamforming, the signals are concentrated in the desired direction via applying a selected precoding vector for the TX antenna array. For Receiver (RX) beamforming, the RX beam of the receiver antennas are concentrated in the incoming direction of the radio signals by applying a selected precoding vector for the RX antenna array. Beam-forming can be used at both the transmitting and receiving ends in order to achieve spatial selectivity. The improvement compared with omnidirectional reception/transmission is known as a beam-forming gain. When multiple antennas are available at transmitters, receivers or both, it is therefore important to apply efficient beam patterns to the antennas to better exploit the spatial selectivity of the corresponding wireless channel.

FIG. 1 schematically shows one example MMW RAT network. As shown in FIG. 1, there is a network node or a control node called as Central Control Unit (CCU), which is at least responsible for parameter configurations and coordination among Access Nodes (ANs), e.g., AN1, AN2, AN3, and AN4.

Typically, received power in a receiver side can be expressed as:

$$P_{rx} = P_{TX} \cdot G_{TX} \cdot G_{RX} \left(\frac{\lambda}{4\pi r}\right)^2 \cdot e^{-\alpha r}$$

where $P_{TX}$ is transmitted power, $G_{TX}$ and $G_{RX}$ are beamforming gains of transmitting and receiving antennas, respectively, $\lambda$ is the wavelength, and $\alpha$ is the attenuation factor due to absorption in the medium. For an MMW-wave link at 60 GHz, oxygen absorption loss can be as high as 16 dB/km.

From the above formula, it is clear that the attenuation of radio wave is proportional to $1/\lambda_2$. With the same propagation distance, 60 GHz attenuates 29.5 dB more compared to 2 GHz, without considering the oxygen absorption.

In considering this, high gain beam-forming is mandatory in order to compensate the extra attenuation. Thanks to the small wavelength, more antenna elements can be integrated in the antenna panel with the same size. This makes it possible to reach a higher beam-forming gain. However, if there are several tens or several hundreds of antenna elements, one Radio Frequency (RF) chain (either TX RF chain or RX RF chain) for each antenna element is inapplicable due to unacceptable cost. In such a case, multiple antenna elements share one RF chain and a specific analog phase adjustment is applied for each antenna in order to adjust the beam direction and maximize the beam-forming gain. Due to the narrow TX beam, it is needed to steer transmission of beacon signals to enable AN discovery area, and to preform beam-forming training to maximize the beam-forming gain.

Meanwhile, high gain beam-forming could bring challenges, including, e.g., hidden problem and deafness problem.

FIG. 2 illustrates an example of the hidden problem caused by directivity of high gain beam-forming. As shown in FIG. 2, link pair 1 is composed by Access Point 1 (AP1) and User Equipment 1 (UE1), and link pair 2 is composed by AP2 and UE2. When AP2 is transmitting to UE2, neither AP 1 or UE 1 can detect the channel utilized by AP2 and UE2 because both AP1 and UE1 are outside of the TX beam coverage from AP2 to UE2. However, when AP1 transmits data to UE1, its TX beam can reach UE2 and cause interference. Hereinafter, the term "link" may refer to a radio link or any other appropriate type of link.

FIG. 3 illustrates an example of the deafness problem caused by directivity of high gain beam-forming. As shown in FIG. 3, UE 1 and AP1 compose link pair 1 and UE2 and AP2 compose link pair 2. The link pair 2 has ongoing data transmission from AP2 to UE2. But this is not detected by UE1 because UE1 does not monitor (or sense) this direction. However, when UE 1 starts data transmission, the data receiving by UE2 can be clearly impacted due to UE1 and UE2 are close to each other.

Currently, it is supposed that the total carrier bandwidth of the MMW-RAT can be up to 1 or 2 GHz. This bandwidth can be composed by a number of sub-band carriers of a certain bandwidth, e.g. 100 MHz. By way of example, FIG. 4 illustrates one MMW-RAT carrier with 4 sub-bands. The smallest resource grid in FIG. 4 corresponds to a sub-band in the frequency domain and to a subframe in the time domain, and may be referred to as a sounding and sensing resource element. Of course, the sounding and sensing resource element may be also in terms of code.

To allocate the available resources, a contention based resource allocation scheme and/or a scheduling based resource allocation scheme may be applied in MMW-RAT as the basic policy of collision avoidance. A contention based resource allocation scheme provides a mechanism to compete for the channel based on the self-determination on the channel availability. In a scheduling based resource allocation scheme, a scheduler, e.g., a CCU as shown in FIG. 1, gains the resource controllability first via either contention based method or coordination method first and allocates the resource to controlled links.

There could be certain combination of the contention based resource allocation scheme and the scheduling based resource allocation scheme. FIG. 5 illustrates an example of a complex interference situation in a MMW-RAT network. As shown in FIG. 5, due to directivity of high gain beam-forming, Link 2 may have unendurable UpLink (UL) to DownLink (DL) interference to Link 1 while Link 6 may have unendurable DL to DL interference and UL to DL interference to Link 5.

Due to directivity of high gain beam-forming, the collision determination is more complex than omni-transmission. The traditional measurement does not work well due to the aforementioned deafness and hidden problems. Besides, though carrier sensing methods commercially used in Wireless Local Area Network (WLAN, 802.11) and Wireless Personal Area Network (WPAN, 802.15) are developed, they are mainly for local access system. It is a distributed carrier sensing scheme, i.e., the carrier sensing is done by each node pair independently. For MMW RAT, firstly it is expected that there can be better dimensioned deployment involving multiple nodes of APs and UEs, and better network controllability (e.g., self-optimization, self-organization, and mobility) than Wireless Fidelity (WiFi) is targeted. Secondly, MMW RAT is expected to provide much better Quality of Service (QoS) than WiFi. In this sense, a better measurement than simple distributed carrier sensing of WiFi is desired.

The interference measurements in 3G and 4G wireless systems are mainly designed to measure the inter-cell/inter-Transmission-Point interference, rather than inter-link interference. Due to small sector size and the large overlapping coverage in case of MMW RAT, the similar measurement as 3G or 4G systems is not enough to identify links in collision and help the interference management.

SUMMARY

It is in view of the above considerations and others that the various embodiments of the present technology have been made. To be specific, the present disclosure proposes to conditionally adapt Aligned Directional Sounding and Sensing (ADSS) configurations or turn on/off ADSS functionality to reduce ADSS overhead and optimize sounding and sensing performance.

According to a first aspect of the present disclosure, there is proposed a method used in a control node controlling a serving radio node in a wireless communication network. The serving radio node serves one or more client radio nodes which are connected to the serving radio node via one or more links. The method includes determining to apply a sounding and sensing related configuration for the serving radio node in each link of the one or more links, if at least one link related parameter of the link satisfies a first predefined condition. The method further includes transmitting an enablement signal to the serving radio node. The enablement signal indicates enabling application of the sounding and sensing related configuration in the link.

In an embodiment, the method further includes: determining not to apply a sounding and sensing related configuration for the serving radio node in the link, if the at least one link related parameter of the link satisfies a second predefined condition; and transmitting a disablement signal to the serving radio node. The disablement signal indicates disabling the application of the sounding and sensing related configuration in the link.

In an embodiment, the at least one link related parameter of the link includes a geometry related parameter of a client radio node of the link and the second predefined condition is that the geometry related parameter is larger than a first predefined threshold, or the at least one link related parameter of the link includes a data rate of the link and the second predefined condition is that the data rate is smaller than a second predefined threshold, or the at least one link related parameter of the link includes a system load of the serving radio node and the second predefined condition is that the system load is smaller than a third predefined threshold, or the at least one link related parameter of the link includes a victim ratio representing a ratio of links to be interfered among the one or more links, and the second predefined condition is that the victim radio is smaller than a fourth predefined threshold.

In an embodiment, the at least one link related parameter of the link includes a geometry related parameter of a client radio node of the link, and the first predefined condition is that the geometry related parameter is smaller than a fifth predefined threshold.

In an embodiment, the geometry related parameter is based on a discovery signal strength and/or quality of the serving radio node or a difference between the discovery signal strength and/or quality of the serving radio node and that of the strongest neighboring radio node.

In an embodiment, the at least one link related parameter of the link includes a data rate of the link, and the first predefined condition is that the data rate of the link is larger than a sixth predefined threshold.

In an embodiment, the at least one link related parameter of the link includes a system load of the serving radio node and the first predefined condition is that the system load is higher than a seventh predefined threshold.

In an embodiment, the at least one link related parameter of the link includes a victim ratio representing a ratio of links to be interfered among the one or more links, and the first predefined condition is that the victim ratio is larger than an eighth predefined threshold.

In an embodiment, each of the links to be interfered has a link SINR (Signal and Interference to Noise Ratio) lower than a predefined SINR threshold.

According to a second aspect of the present disclosure, there is proposed a method used in a serving radio node under control of a control node in a wireless communication network. The serving radio node serves one or more client radio nodes which are connected to the serving radio node via one or more links. The method includes receiving, from the control node, an enablement signal indicating enabling application of a sounding and sensing related configuration in each of the one or more links, if at least one link related parameter of the link satisfies a first predefined condition; and enabling application of the sounding and sensing related configuration in the link based on the enablement signal.

In an embodiment, the method further includes: receiving, from the control node, a disablement signal indicating disabling the application of the sounding and sensing related configuration in the link, if the at least one link related parameter of the link satisfies a second predefined condition; and disabling application of the sounding and sensing related configuration in the link based on the disablement signal.

According to a third aspect of the present disclosure, there is proposed a method used in a control node controlling a serving radio node in a wireless communication network. The serving radio node serves one or more client radio nodes which are connected to the serving radio node via one or more links. The method includes: determining a sounding and sensing related configuration for the serving radio node to be applied in each link of the one or more links based on at least one link related parameter of the link; and transmitting the determined sounding and sensing related configuration to the serving radio node.

In an embodiment, the at least one link related parameter of the link includes a system load of the serving radio node.

In an embodiment, the sounding and sensing related configuration includes a sounding and sensing duration, during which the one or more client radio nodes perform sounding and sensing. Said determining a sounding and sensing related configuration comprises: determining the sounding and sensing duration based on the system load.

In an embodiment, the at least one link related parameter of the link includes statistics on beam switch intervals of the one or more links.

In an embodiment, the sounding and sensing related configuration includes a sounding and sensing period. Said determining a sounding and sensing related configuration comprises: determining the sounding and sensing period based on the statistics on beam switch intervals.

In an embodiment, a beam switch interval of each of the one or more links is dependent on a moving speed of the corresponding client radio node.

In an embodiment, the method further includes: receiving the moving speed of the corresponding client radio node from the serving radio node.

According to a fourth aspect of the present disclosure, there is proposed a control node controlling a serving radio node in a wireless communication network. The serving radio node serves one or more client radio nodes which are connected to the serving radio node via one or more links. The control node includes: a determining unit configured to determine to apply a sounding and sensing related configuration for the serving radio node in each link of the one or more links, if at least one link related parameter of the link satisfies a first predefined condition; and a transmitting unit configured to transmit an enablement signal to the serving radio node. The enablement signal indicates enabling application of the sounding and sensing related configuration in the link.

According to a fifth aspect of the present disclosure, there is proposed a serving radio node under control of a control node in a wireless communication network. The serving radio node serves one or more client radio nodes which are connected to the serving radio node via one or more links. The serving radio node includes: a receiving unit configured to receive, from the control node, an enablement signal indicating enabling application of a sounding and sensing related configuration in each of the one or more links, if at least one link related parameter of the link satisfies a first predefined condition; and an enabling unit configured to enable application of the sounding and sensing related configuration in the link based on the enablement signal.

According to a sixth aspect of the present disclosure, there is proposed a control node controlling a serving radio node in a wireless communication network. The serving radio node serves one or more client radio nodes which are connected to the serving radio node via one or more links. The control node includes: a determining unit configured to determine a sounding and sensing related configuration for the serving radio node to be applied in each link of the one or more links based on at least one link related parameter of the link; and a transmitting unit configured to transmit the determined sounding and sensing related configuration to the serving radio node.

According to a seventh aspect of the present disclosure, there is proposed a control node. The control node includes a transceiver, a processor and a memory. The memory contains instructions executable by the processor whereby the control node is operative to: determine to apply a sounding and sensing related configuration for the serving radio node in each link of the one or more links, if at least one link related parameter of the link satisfies a first predefined condition; and transmit an enablement signal to the serving radio node. The enablement signal indicates enabling application of the sounding and sensing related configuration in the link.

According to an eighth aspect of the present disclosure, there is proposed a serving radio node. The serving radio node includes a transceiver, a processor and a memory. The memory contains instructions executable by the processor whereby the serving radio node is operative to: receive, from the control node, an enablement signal indicating enabling application of a sounding and sensing related configuration in each of the one or more links, if at least one link related parameter of the link satisfies a first predefined condition; and enable application of the sounding and sensing related configuration in the link based on the enablement signal.

According to a ninth aspect of the present disclosure, there is proposed a control node. The control node includes a transceiver, a processor and a memory. The memory contains instructions executable by the processor whereby the control node is operative to: determine a sounding and sensing related configuration for the serving radio node to be applied in each link of the one or more links based on at least one link related parameter of the link; and transmit the determined sounding and sensing related configuration to the serving radio node.

According to a tenth aspect of the present disclosure, there is provided a computer program product storing instructions that when executed, causing one or more computing devices to perform the method according to any one of the first to the third aspects.

The above embodiments of the first aspect are also applicable for the second, the fourth, the fifth, the seventh, the eighth and the tenth aspects. The above embodiments of the third aspect are also applicable for the sixth, the ninth and the tenth aspects.

According to the first, the second, the fourth, the fifth, the seventh, the eighth and the tenth aspects of the present disclosure, the present disclosure can selectively apply ADSS for a link based on a probability that the link would generate and/or experience larger interference, instead of performing ADSS for all links. This can reduce ADSS overhead while improving system performance.

According to the third, the sixth, the ninth and the tenth aspects of the present disclosure, the present disclosure can adapt one or more ADSS related parameters (instead of using a fixed configuration for ADSS) according to various conditions. This can reduce ADSS overhead and optimize system performance.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 illustrates an example of a complex interference situation in a MMW-RAT network.

FIG. 6 depicts an example of a wireless communication network in which embodiments herein may be implemented.

FIG. 9 shows a flowchart of a method 900 performed in a receiving node of a link according to embodiments of the present disclosure.

FIG. 10 illustrates an example sensing resource allocation structure according to embodiments of the present disclosure.

DETAILED DESCRIPTION

Figure 1:
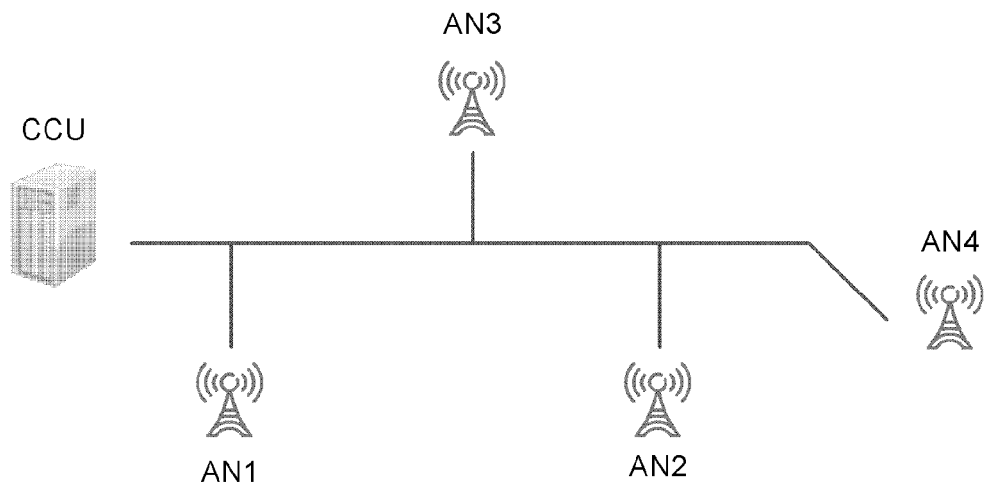
FIG. 1 schematically shows one example MMW RAT network.
Figure 2:
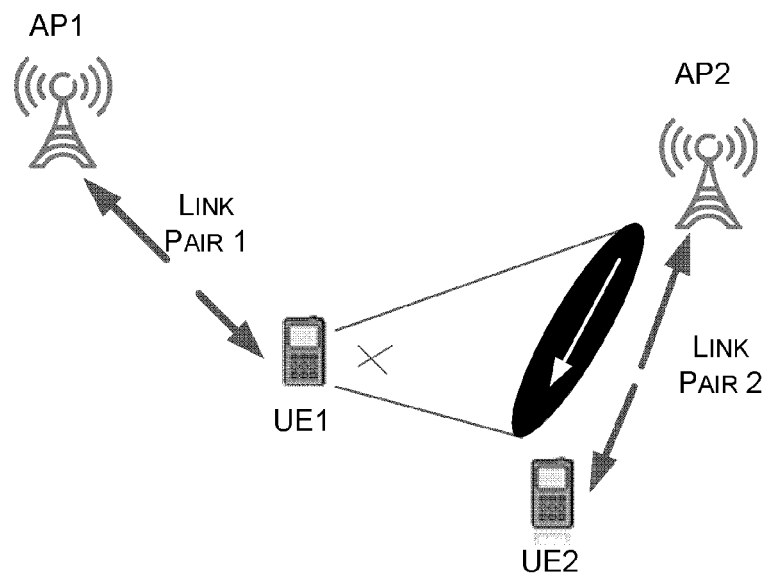
FIG. 2 illustrates an example of the hidden problem caused by directivity of high gain beam-forming.
Figure 3:
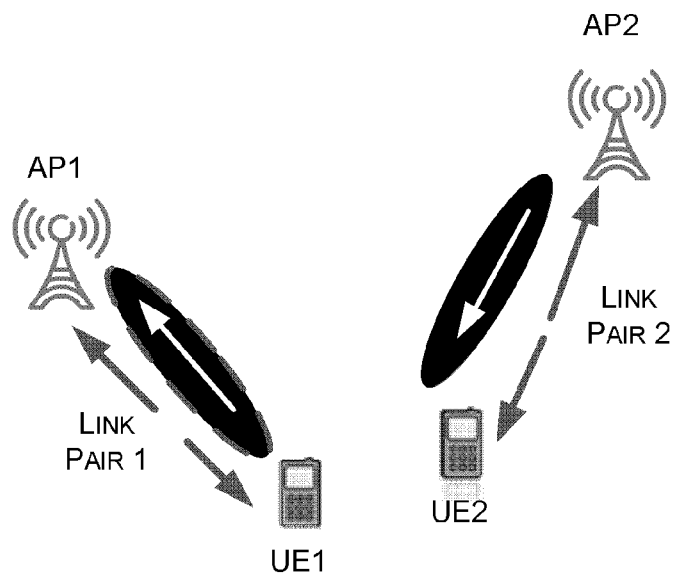
FIG. 3 illustrates an example of the deafness problem caused by directivity of high gain beam-forming.
Figure 4:
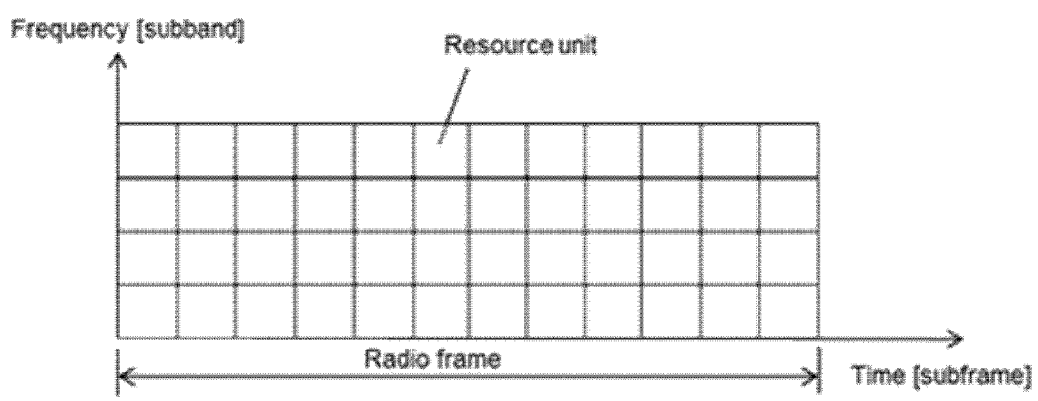
FIG. 4 illustrates one MMW-RAT carrier with 4 sub-bands.

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Herein, an active link here refers to a link actually established between a client radio node and its server radio node. For example, in the Long Term Evolution (LTE) system, when a UE successfully accesses to an enhanced Node B (eNB), it can be said that there is an active link established between the UE and the eNB. Such an active link may be UL or DL. A candidate link for an active link refers to a potential link that has possibilities to be established for replacing the active link and has not been established yet. A transmitting node of a candidate link may transmit its sounding signal in a direction of the candidate link to the corresponding receiving node, but there is no real link established between the transmitting node and the receiving node.

Hereinafter, a link refers to an active link for simplification, unless otherwise explicitly indicated as a candidate link.

First of all, the present disclosure proposes to align directional sounding and sensing parameters (this solution may be referred to as Aligned Directional Sounding and Sensing (ADSS) hereinafter) for links, e.g., in an MMW RAT network.

To be specific, the present disclosure configures a transmitter of each link pair (i.e., link transmitter and receiver) with a time-frequency radio resource pattern to send directional sounding beam in its link direction, and correspondingly configures a receiver of each link pair with the same time-frequency radio resource pattern to directionally monitor all possible sounding signals in its link directions. Thereby, receivers of all link pairs may be in a directional sensing state when their corresponding transmitters are sending directional sounding signals. In this way, the victim link pairs and the interfering link pairs can be accurately identified and the mutual interference levels can be measured. That is, an effective inter-link interference map (also referred to as DLIM) of an MMW RAT network can be derived. Such measurement information can be used to enhance the resource allocation schemes, e.g., time, frequency and transmit power resource.

FIG. 6 depicts an example of a wireless communication network in which ADSS may be implemented. The wireless communication network comprises a Central Control Unit (CCU) 600 and a plurality of radio nodes (also referred to as access nodes (ANs)) whereof six ANs are depicted in FIG. 6. The CCU 600 may be a Node B, a Base Station (BS), an eNodeB, an Home Node B, an Home eNode B, a relay node, an AP or any other control node or network node at least responsible for parameter configurations and coordination among ANs as well as controlling links among ANs, in any wireless system or cellular network, such as an LTE network, any 3rd Generation Partnership Project (3GPP) cellular network, an MWV network, a Wimax network, a WLAN/Wi-Fi, a WPAN etc. Each radio node may e.g., be a wireless device, a mobile wireless terminal or a wireless terminal, a mobile phone, a computer such as a laptop, a Personal Digital Assistants (PDAs) or a tablet computer, sometimes referred to as a phablet, with wireless capability (the foregoing ones may be collectively known as a UE), a sensor or actuator with wireless capabilities or any other radio network units capable to communicate over a link in a wireless communication network. It should be noted that the term "radio node" or "AN" used in this document also covers other wireless devices such as Machine to Machine (M2M) devices, also denoted Machine Type Communication (MTC) devices. In this example, four ANs are exemplified as APs, i.e., AP 610, AP 620, AP 630, and AP 640, and two ANs are exemplified as UEs, i.e., UE 650 and UE 660. Furthermore, each AN can be regarded as either a transmitting node or a receiving node in different links. For example, in a link on which AP 610 transmits data to UE 650, AP 610 is a transmitting node, and UE 650 is a receiving node. In contrast, in a link on which AP 610 receives data from UE 650, AP 610 is a receiving node, and UE 650 is a transmitting node. To put it differently, a radio node or an AN may be either a client radio node or a server radio node, depending on its role. For example, if a radio node is UE 660 as shown in FIG. 6, AP 620 serves its server radio node. It is also possible that a UE may play a role of a server radio node when the UE serves as a hot point and serves other UEs. In this case, the server radio node is the UE, and client radio nodes may be other UEs served by the UE.

Figure 7:
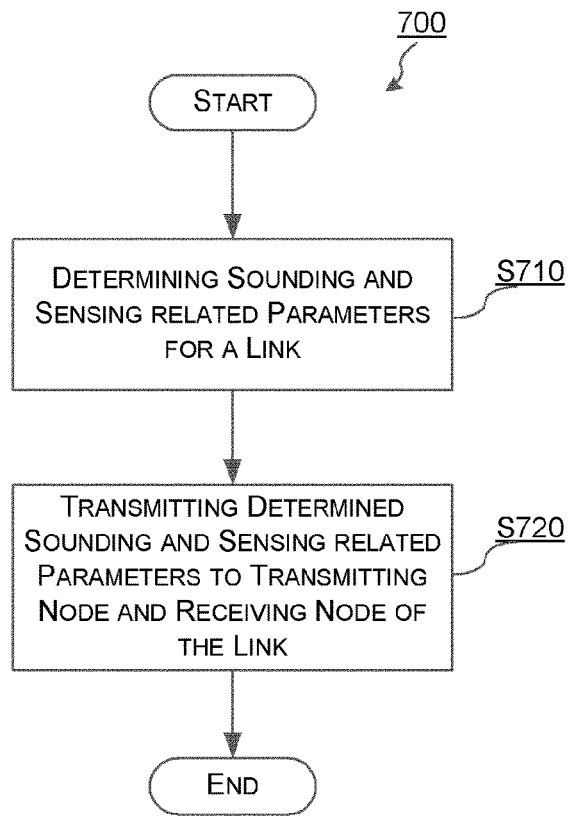
FIG. 7 shows a flowchart of a method 700 performed in a control node according to embodiments of the present disclosure.

FIG. 7 shows a flowchart of a method 700 performed in a control node, e.g., CCU 600 in FIG. 6, according to embodiments of the present disclosure. To be specific, the method 700 is used for implementing ADSS at network side.

At step S710, the control node determines sounding and sensing related parameters for a link, e.g., a link between AP 610 and UE 650 as shown in FIG. 6. The determined sounding and sensing related parameters include dedicated sounding and sensing related parameters for the link and common sounding and sensing related parameters for all links controlled by the control node. The common sounding and sensing related parameters include a sounding and sensing period and a sounding and sensing interval (i.e., a duration for sounding and sensing).

As a feasible implementation, the control node may determine the sounding and sensing related parameters upon receipt of a setup request for the link from, e.g., either end of the link, e.g., AP 610 or UE 650, etc.

At step S720, the control node transmits the determined sounding and sensing related parameters to a transmitting node and a receiving node of the link. For example, the transmitting node is AP 610 and the receiving node is UE 650, as shown in FIG. 6.

In an implementation, the common sounding and sensing related parameters may further include: a rule for the receiving node reporting its sensing result to the control node.

In another implementation, the dedicated sounding and sensing related parameters for the link may include a sounding resource parameter for specifying a sounding resource element for the transmitting node transmitting a sounding signal. The specified sounding resource element is in terms of at least one or more of: time, frequency, and code.

In another implementation, the method 700 may further include the following steps (not shown) of: receiving one or more sensing results from all receiving nodes of all links under control of the control node; determining a DLIM based on the received one or more sensing results; and determining a resource allocation scheme or a resource allocation strategy for data transmission in all links controlled by the control node based on the determined DLIM.

One major advantage with the method 700 is receiving nodes of all link pairs may be in a directional sensing state when the transmitting nodes of their neighboring links are sending directional sounding signals. This enables one link to identify all interfering links and measure the interference level from these interfering links, based on which the network can efficiently improve spatial reuse of frequency resources while avoiding and/or controlling collisions among different links.

Figure 8:
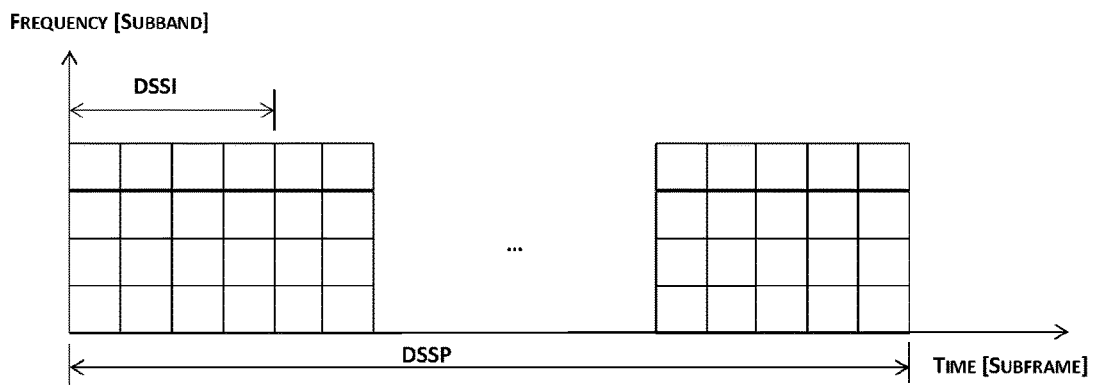
FIG. 8 illustrates a general sounding and sensing resource allocation structure according to embodiments of the present disclosure.

FIG. 8 illustrates a general sounding and sensing resource allocation structure according to embodiments of the present disclosure.

As shown in FIG. 8, Directional Sounding and Sensing Period (DSSP) denotes a sounding and sensing period, and Directional Sounding and Sensing Interval (DSSI) denotes a sounding and sensing interval, i.e., a window/a duration for sounding and sensing. The DSSP and DSSI are common sounding and sensing related parameters for all links controlled by the control node, and may be determined by the control node.

The DSSP and DSSI are mainly in terms of time domain. For example, the DSSP and DSSI both refer to time windows. In this case, a transmitting node of each link may transmit a sounding signal to a receiving node of the link in a direction of the link during a time window defined by the DSSI, and the receiving node senses all sounding signals in a direct of the link during the same time window. Thereby, inter-link interferences, e.g., DL-DL interference between link 5 and link 6 as shown in FIG. 5, can be sensed in an efficient manner.

Optionally, the DSSP and DSSI may be further in terms of frequency domain. For example, the DSSI may further define one or more sub-bands to be used by the transmitting node/the receiving node of the link.

Within the DSSI, there are a number of sounding and sensing resource elements, some of which are allocated to a link for transmitting a sounding signal by means of dedicated sounding and sensing related parameters and thus are called as Sounding Resource Units (SRUs). One sounding and sensing resource element may be defined in terms of at least one or more of: time, frequency, and code. For example, one sounding and sensing resource element may be defined as one time-frequency resource unit plus an orthogonal sequence. This means that multiple sounding signals may be multiplexed over one time-frequency unit by using orthogonal sequences.

In practice, the DSSI length may be determined based on the link density in the network and the DSSP length may be short enough to track the TX/RX beam change of link pairs, including both TX/RX direction change and TX power change.

An exemplary DLIM may be described by referring to FIG. 5. As shown in FIG. 5, the DLIM can indicate the received sounding signal power from the transmitter of each link (Link i, e.g., any one of links 1-6 as shown in FIG. 5) and the received sounding signal strengths from other links whose sounding signals are detected by the link (Link i) receiver.

The DLIM may identify whether a transmitter of a first link contributes considerable interference to a receiver of a second link. If there is considerable interference contributed, the interference level and the corresponding link identity are included in the DLIM. Relying the sounding signals (SRU) and corresponding signal strengths reported from a receiver, the control node can identify the links and corresponding interference levels to the receiver.

For example, the DLIM may be updated upon receipt of a new directional sounding report from a receiver, or upon link setup/link release.

With such DLIM, the present disclosure can enhance the radio resource allocation (e.g. time, frequency and TX power resource), so that the spatial reuse can be efficiently and sufficiently improved.

FIG. 9 shows a flowchart of a method 900 performed in a receiving node of a link, such as a link between AP 610 and UE 650 as shown in FIG. 6, according to embodiments of the present disclosure. To be specific, the method 900 is used for performing ADSS at receiving side. In this case, the receiving node may be AP 610 or UE 650. For illustration, UE 650 is taken as the receiving node here, and correspondingly AP 610 serves as a corresponding transmitting node for the receiving node, and vice versa.

At step S910, UE 650 receives sounding and sensing related parameters for the link from a control node, e.g., the CCU 600 in FIG. 6. The received sounding and sensing related parameters include dedicated sounding and sensing related parameters for the link and common sounding and sensing related parameters for all links controlled by the control node. The common sounding and sensing related parameters include a sounding and sensing period and a sounding and sensing interval.

At step S920, UE 650 senses all sounding signals in a direction of the link based on the received sounding and sensing related parameters.

At step S930, UE 650 reports one or more sensing results to the control node.

In an implementation, the common sounding and sensing related parameters further include: a rule for UE 650 reporting the one or more sensing results to the control node.

During the sounding interval, all receiving nodes shall be in blindly monitoring state in its link direction. Each receiving node shall target its RX beam in an incoming direction of its link. In order to leave some room for the RX beam adjustment during one sounding period, the RX beam for directional sensing could be wider than the RX beam for actual data receiving.

Via blind detection, the receiving node may determine information on SRU of the detected sounding signals. This information shall be reported to the control node for possible interfering transmitter identification. Moreover, the receiving node may further measure the strength of each detected sounding signal. This measurement result shall be reported to the CCU to derive the DLIM, which can be used to determine the maximum allowed TX power for a transmitter or interference coordination pattern in order to control the interference.

FIG. 10 illustrates an example sensing resource allocation structure according to embodiments of the present disclosure. As shown in FIG. 10, each receiving node may sense all possible sounding signals in its link direction over all SRUs during the DSSI.

One major advantage with the method 900 is that the receiving node can sense all sounding signals in a direction of the link in a time window during which the transmitting nodes of the neighboring links are transmitting sounding signals. When the method 900 is applied in two neighboring links, interference between these two links can be sensed in an efficient manner.

Figure 11:
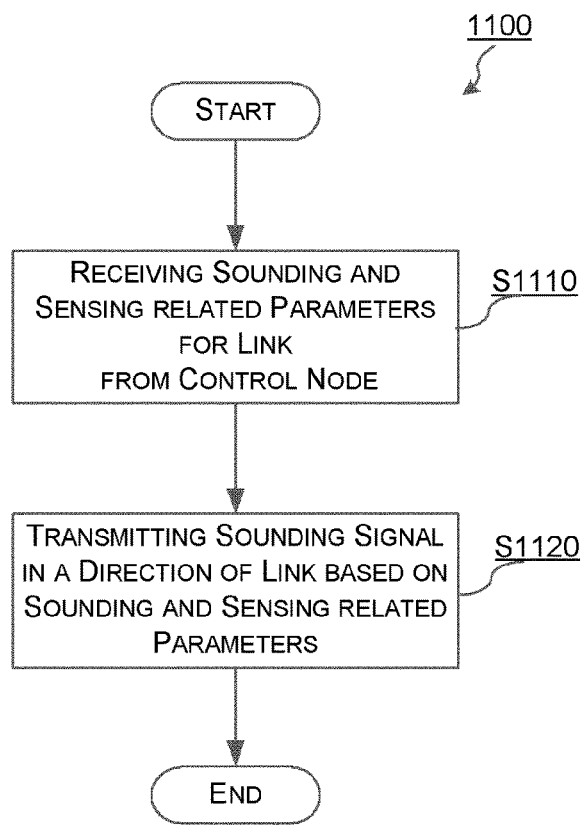
FIG. 11 shows a flowchart of a method 1100 performed in a transmitting node of a link according to embodiments of the present disclosure.

FIG. 11 shows a flowchart of a method 1100 performed in a transmitting node of a link, such as a link between AP 610 and UE 650 as shown in FIG. 6, according to embodiments of the present disclosure. To be specific, the method 900 is used for performing ADSS at transmitting side. In this case, the transmitting node may be AP 610 or UE 650. For illustration, AP 610 is taken as the transmitting node here, and correspondingly UE 650 serves as a corresponding receiving node for the transmitting node, and vice versa.

At step S1110, AP 610 receives sounding and sensing related parameters for the link from a control node, e.g., the CCU 600 as shown in FIG. 6. The received sounding and sensing related parameters include dedicated sounding and sensing related parameters for the link and common sounding and sensing related parameters for all links controlled by the control node. The common sounding and sensing related parameters include a sounding and sensing period and a sounding and sensing interval, e.g., DSSP and DSSI as shown in FIG. 8.

At step S1120, AP 610 transmits a sounding signal in a direction of the link based on the sounding and sensing related parameters.

In an implementation, the dedicated sounding and sensing related parameters for the link include a sounding resource parameter for specifying a sounding resource element for the transmitting node transmitting the sounding signal. The specified resource unit is in terms of at least one or more of: time, frequency and code.

Figure 12:
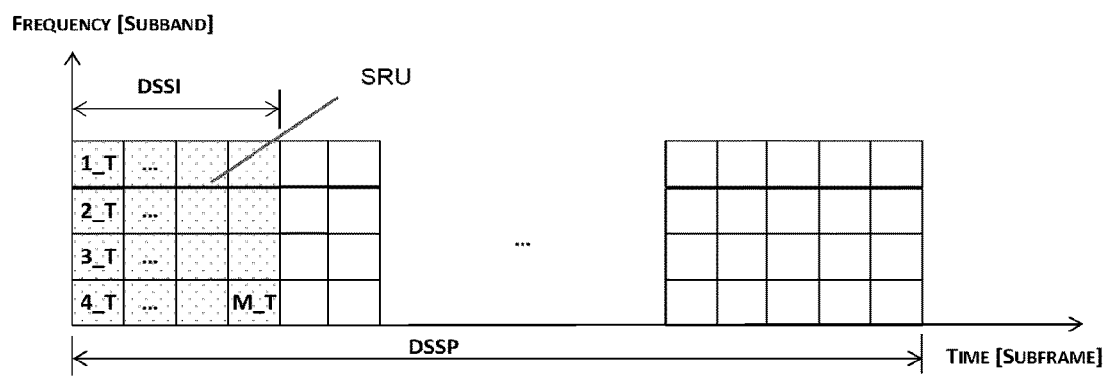
FIG. 12 illustrates an example sounding resource allocation structure according to embodiments of the present disclosure.

FIG. 12 illustrates an example sounding resource allocation structure according to embodiments of the present disclosure.

As shown in FIG. 12, each transmitting node may be allocated with one SRU, and there are totally M transmitters controlled by the control node, e.g., the CCU 600 as shown in FIG. 6. Optionally, each SRU may be also defined in terms of frequency. For example, each SRU may occupy one sub-band.

One major advantage with the method 1100 is that the transmitting node can transmit a sounding signal in a direction of the link in a time window during which the receiving nodes of itself and its neighboring links are sensing the sounding signal. When the method 1100 is applied in two neighboring links, interference between these two links can be sensed in an efficient manner.

Figure 13:
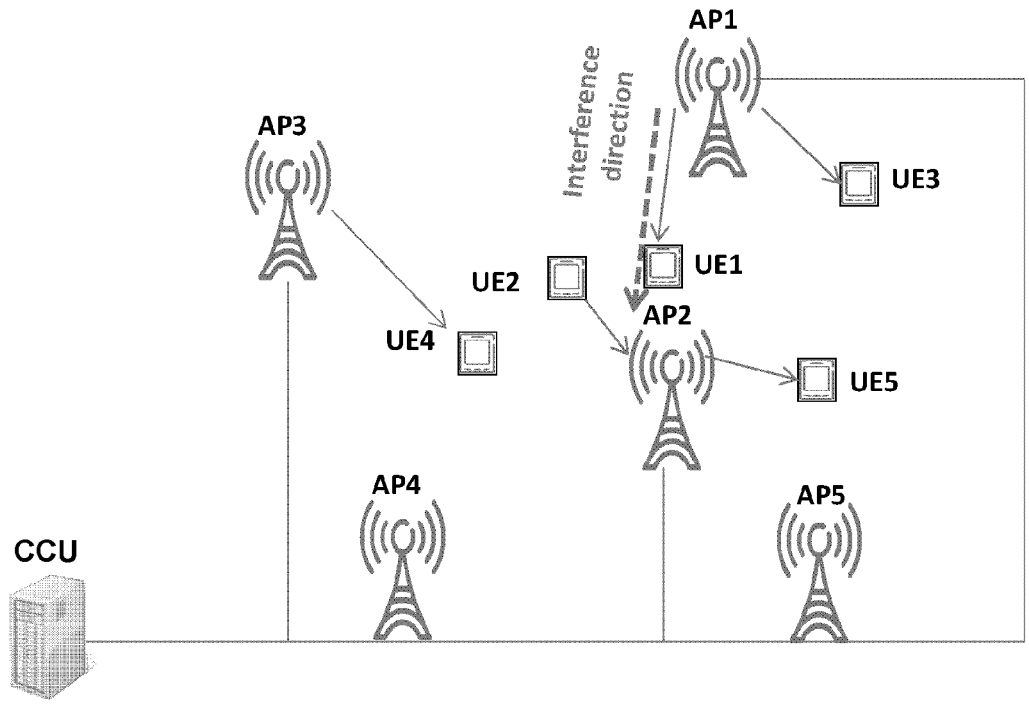
FIG. 13 shows a diagram illustrating an exemplary DLIM according to the present disclosure.

FIG. 13 shows a diagram illustrating an exemplary DLIM according to the present disclosure. For example, the DLIM may be determined by a CCU such as CCU 600 in FIG. 6 using the method 700.

It is assumed that there are five active links under control of CCU. Under such an assumption, the DLIM is determined for these five active links. As shown in FIG. 13, the DLIM identifies that the link from UE2 to AP2 experiences strong interference from AP1.

When a UE's link (either UL or DL) is identified as an interfering link to another link or as a victim link of another link, spatial direction change (i.e., adjusting spatial reusing) is one promising method to mitigate the interference in case of high gain beamforming. This is especially true for super density network where the neighboring APs have high ratio of overlapped coverage. This provides the good feasibility to adjust spatial direction change when necessary.

However, the spatial direction change may result in unpredictable interference situation. With the above concept of ADSS, ADSS is only performed for active links. But, for an active link, there may be one or more candidate links that have possibilities to be established for replacing the links. The ADSS cannot allow the network to derive the interference situation (interference to others and/or from others) for such candidate links.

Aiming to such issues, the present disclosure further proposes to extend the above ADSS to support interference aware spatial directional change for spatial reuse optimization. Hereinafter, the extended ADSS may be referred to as extended (or improved) ADSS.

The basic idea of the extended ADSS lies in:
1) ADSS can be performed for both active links and candidate links if possible;
2) An extended DLIM is derived to include both the interference situation of all the active links and the predicted interference situation of all the candidate links; and
3) One or more preferred candidate links may be selected to replace one or more active links of a UE based on the extended DLIM when there is considerable interference to/from another link.

With the extended DLIM, some optimal links can be determined according to certain predefined rules for spatial reuse.

Figure 14:
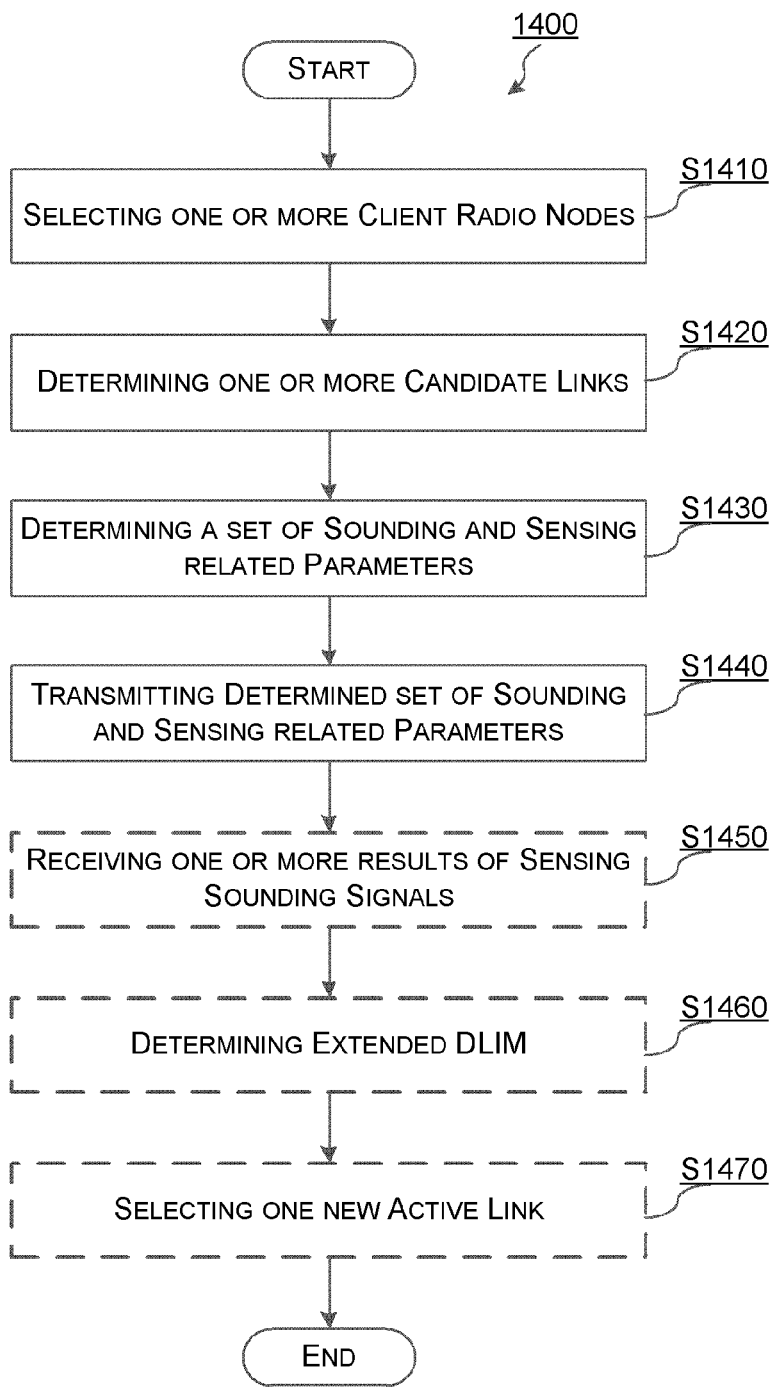
FIG. 14 shows a flowchart of a method 1400 used in a control node according to embodiments of the present disclosure.

FIG. 14 shows a flowchart of a method 1400 used in a control node, e.g., e.g., CCU 600 in FIG. 6, according to embodiments of the present disclosure. To be specific, the method 1400 is used to implement the extended ADSS at network side.

The control node controls a server radio node that serves one or more client radio nodes. The server radio node may be, e.g., any AN as depicted in FIG. 6. For example, if a client radio node is UE 660, then the server radio node is AP 620. It is also possible that a UE plays a role of a server radio node, when the UE serves as a hot point and serves other UEs. Taking UE 660 as shown in FIG. 6 as an example, in this case, UE 660 may be a server radio node, and other UEs served by UE 660 may be client radio nodes. To put it differently, the server radio node here may be either a transmitting node or a receiving node of a link, either an active link or a candidate link.

At step S1410, the control node selects one or more client radio nodes based on a DLIM for all active links under control of the control node. Each of the one or more client radio nodes is served by a server radio node under control of the control node, and there is an active link between each of the one or more client radio nodes and its server radio node. It should be noted that the DLIM here is intended for all active links under control of the control node. As an example, the DLIM here may be determined by the method 700 according to the present disclosure.

For example, the DLIM may be the DLIM as illustrated in FIG. 13. In such an example, the control node (i.e., CCU as illustrated) may select any of client radios nodes such as UE1, UE2, UE3, UE4 or UE5 based on the interference situation identified by the DLIM.

There are various criteria available for selecting client radio nodes for the extended ADSS. Several exemplary implementations will be described for illustration. It would be appreciated that the present disclosure is not limited thereto.

In a first implementation, step S1410 may be implemented by selecting a first client radio node if an interference from an active link of the first client radio node to an active link of a second client radio node exceeds a first predetermined interference threshold. For example, in the scenario as shown in FIG. 13, if the DLIM identifies that an interference from an active link of UE2 to an active link of UE5 exceeds the first predetermined interference threshold, UE2 may be selected for the extended ADSS.

In a second implementation, step S1410 may be implemented by selecting the first client radio node if a ratio between an interference strength from the active link of the first client radio node to a signal strength of the active link of the second client radio node exceeds a second predetermined interference threshold. Still taking FIG. 13 as an example, if the DLIM indicates that a ratio between an interference strength from the active link of UE2 to a signal strength of the active link of UE5 exceeds the second predetermined interference threshold, UE2 may be selected for the extended ADSS.

In a third implementation, step S1410 may be implemented by selecting the first client radio node if an interference from the active link of the first client radio node to the active link of the second client radio node exceeds a third predetermined interference threshold, and a radio quality of the active link of the second client radio node is lower than a predetermined radio quality threshold. Still taking FIG. 13 for illustration, if the DLIM indicates that an interference from the active link of UE2 to the active link of UE5 exceeds the third predetermined interference threshold, and a radio quality of the active link of UE5 is lower than the predetermined radio quality threshold, UE2 may be selected for the extended ADSS.

In a fourth implementation, step S1410 may be implemented by selecting a client radio node, if an experienced interference by an active link of the client radio node exceeds a fourth predetermined interference threshold. Taking FIG. 13 as an example, if an experienced interference by the active link from UE2 to AP2 exceeds the fourth predetermined interference threshold, UE2 may be selected for the extended ADSS.

In a fifth implementation, step S1410 may be implemented by selecting a client radio node if a SNR or SINR of the active link of the client radio node falls below a predetermined SNR/SINR threshold. Taking FIG. 13 as an example, if a SNR or SINR of the active link from UE2 to AP2 falls below the predetermined SNR/SINR threshold, UE2 may be selected for the extended ADSS.

In a sixth implementation, step S1410 may be implemented by selecting the client radio node if the SNR or SINR of the active link of the client radio node falls below the predetermined SNR/SINR threshold and the experienced interference by the active link of the client radio node exceeds the fourth predetermined interference threshold. Still taking FIG. 13 as an example, if a SNR or SINR of the active link from UE2 to AP2 falls below the predetermined SNR/SINR threshold and an experienced interference by the active link from UE2 to AP2 exceeds the fourth predetermined interference threshold, UE2 may be selected for the extended ADSS.

In a seventh implementation, step S1410 may be implemented by receiving a selection of a client radio node from its server radio node when traffic load of the server radio node exceeds a predetermined traffic load threshold. In the scenario of FIG. 13, for example, if AP2 identifies that traffic load of UE2 exceeds the predetermined traffic load threshold, AP2 may select UE2 and reports it to CCU for the extended ADSS.

In an eighth implementation, step S1410 may be implemented by selecting a client radio node, if traffic load of a server radio node serving the client radio node exceeds traffic load of one neighboring radio node of the server radio node. Still taking FIG. 13 as an example, if CCU identifies that traffic load of AP2 exceeds traffic load of AP2's one neighboring radio node, such as AP3 or AP4, CCU may select UE2 for the extended ADSS.

It should be noted that any of the first to the fourth predetermined interference thresholds, the predetermined radio quality threshold, the predetermined SNR/SINR threshold, and the predetermined traffic load threshold may be preconfigured at the network side or at the radio node side.

At step S1420, the control node determines, for each of the selected one or more client radio nodes, one or more candidate links between the client radio node and other radio nodes. It is also possible that the candidate links are determined at the serving radio node side, which will be described later.

Figure 15:
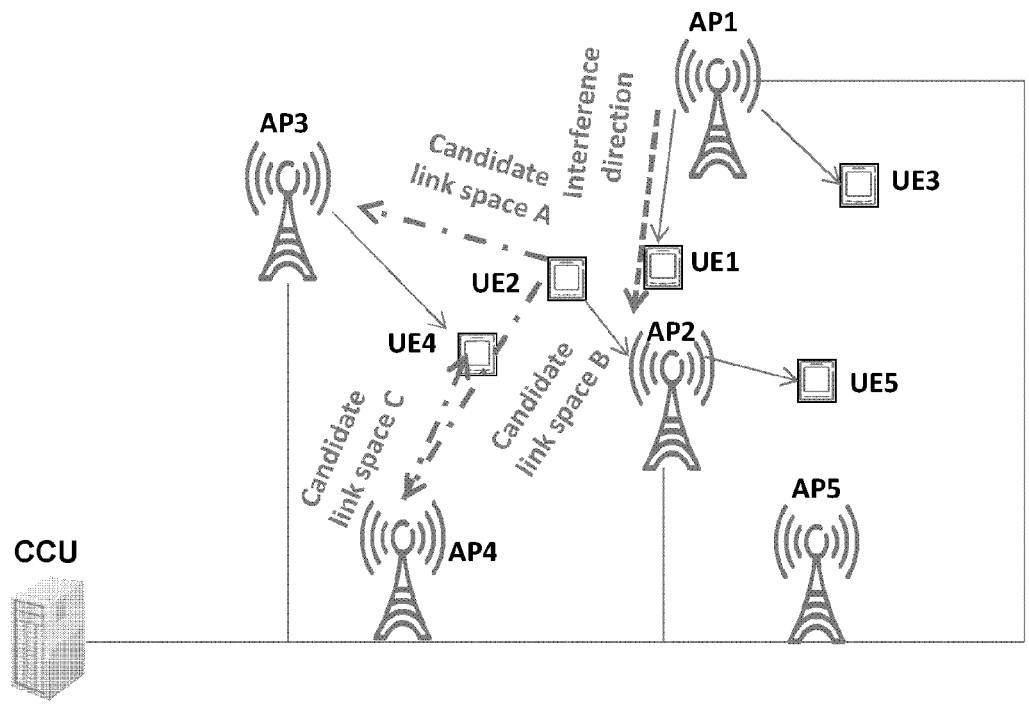
FIG. 15 illustrates an exemplary scenario in which several candidate links for link redirection are determined according to the present disclosure.

FIG. 15 illustrates an exemplary scenario in which several candidate links for link redirection are determined according to the present disclosure.

As shown in FIG. 15, UE2 has been selected for the extended ADSS. Then, the control node determines two candidate links, i.e., a candidate link from UE2 to AP3 and a candidate link from UE2 to AP4, for replacing the active link from UE2 to AP2.

As another example, UE4 has been selected for the extended ADSS. In this case, the control node may determine one candidate link, i.e., a candidate link from AP4 to UE4, for replacing the active link from AP3 to UE4.

At step S1430, the control node applies the extended ADSS for all active links and all the determined candidate links. Step S1430 mainly differs from step S710 in that the latter focuses on active links while the former is directed to not only active links but also candidate links.

To be specific, the control node determines, for each of the determined candidate links and all active links under control of the control node, a set of sounding and sensing related parameters. The determined set of sounding and sensing related parameters includes a set of dedicated sounding and sensing related parameters for the link and a set of common sounding and sensing related parameters for all of the determined candidate links and all active links under control of the control node. The set of common sounding and sensing related parameters includes a sounding and sensing period and a sounding and sensing interval (i.e., a duration for sounding and sensing). For example, the sounding and sensing related parameters may be illustrated by FIG. 10 and/or FIG. 12. Then, the sounding and sensing period may be denoted as DSSP and the sounding and sensing interval may be indicated by DSSI.

In an implementation, the set of dedicated sounding and sensing related parameters for the link comprise a sounding resource parameter for specifying a resource unit for the transmitting node transmitting a sounding signal, the specified resource unit being in terms of at least one or more of: time, frequency, and code. For example, the specified resource unit here may be SRU as shown in FIG. 10 or FIG. 12.

At step S1440, the control node transmits the determined set of sounding and sensing related parameters for each of the determined candidate links and all active links to a transmitting node and a receiving node of the link.

Optionally, the method 1400 may further include steps S1450-S1470. At step S1450, the control node receives one or more results of sensing sounding signals from all receiving nodes of all of the determined candidate links and all active links under control of the control node. At step S1460, the control node determines an extended DLIM based on the received one or more sensing results. At step S1470, the control node selects, for one client radio node among the selected one or more client radio nodes, one new active link from corresponding one or more candidate links of the client radio node based on the determined extended DLIM.

Figure 16:
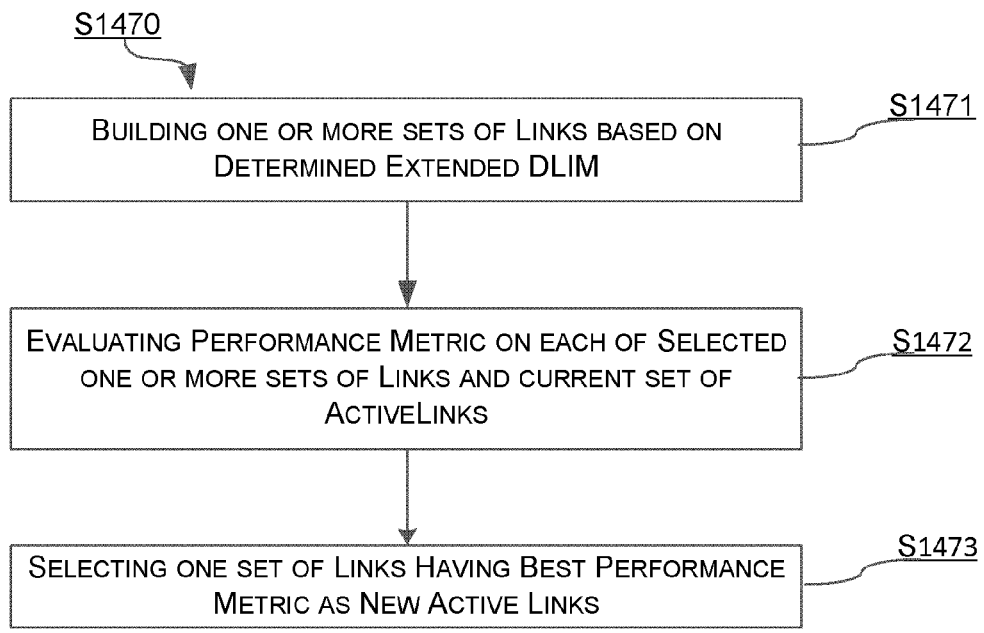
FIG. 16 shows a detailed implementation of step S1470 according to the present disclosure.

Step S1470 may optionally include steps S1471, S1472 and S1473 as illustrated in FIG. 16.

At step S1471, the control node builds one or more sets of links based on the determined extended DLIM. One of the one or more sets of links have possibilities to be used for replacing a current set of active links, e.g., links denoted as solid lines with arrowheads in FIG. 15. At step S1472, the control node evaluates a performance metric on each of the selected one or more sets of links and the current set of active links. At step S1473, the control node selects one set of links having the best performance metric as new active links. Greedy Rule may be used for selecting the new active links. There are various examples available for selecting the new active links by utilizing Greedy Rule. Greedy Rule is mainly embodied at step S1471. Several exemplary implementations will be described for illustration. It would be appreciated that the present disclosure is not limited thereto.

In an implementation, step S1471 may be implemented by replacing one or more active links among the current set of active links with one or more candidate links to build one set of the one or more sets of links. Taking the scenario as shown in FIG. 15 as an example, the current set of active links are denoted in solid lines with arrowheads. Then, one or more active links among such a set may be replaced by one or more candidate links (denoted in dash dot lines with arrowheads) to build one set of the one or more sets of links. For example, the active link from UE2 to AP2 may be replaced with either the candidate link from UE2 to AP3 or the candidate link from UE2 to AP4. As a further example, the active link from AP3 to UE4 may be replaced by the candidate link from AP4 to UE4.

In another implementation, step S1471 may be implemented by removing one or more active links from the current set of active links to build one set of the one or more sets of links. In the scenario as shown in FIG. 15, one or more of active links may be removed from the current set of active links to build one set of the one or more sets of links. For example, the active link from AP1 to UE1 may be removed.

In yet another implementation, step S1471 may be implemented by adding one or more candidate links into the current set of active links to build one set of the one or more sets of links.

There are various examples for the performance metric, some of which will be described for illustration. It would be appreciated that the present disclosure is not limited thereto.

As an example, the performance metric may be a link's SINR. In this example, the control node may estimate SINR of each of the selected one or more sets of links and the current set of active links, and then select one combination that maximizes (one or a set of) link's SINR.

As another example, the performance metric may be a link's capacity. In such an example, the control node may estimate capacity (Shannon's or with knowledge of MCS selection) of each of the selected one or more sets of links and the current set of active links, and then select one combination that maximizes (one or a set of) link's capacity.

As a further example, the evaluating at step S1472 may be implemented by averaging each concerned link's performance metric, e.g., linearizing, or log-averaging, or applying certain fairness criterion such as Alpha-fairness, min-max, on each concerned link's performance metric, etc.

Alternatively, Step S1470 may be implemented depending on the number of client radio nodes severed by one server radio node at the same time. As well known, it is possible that one radio node can serve more than one client radio nodes at the same time. In such a case, these client radio nodes will have to share resources, which may result in the lower individual throughput. In consideration of this, the number of client radio nodes served by one server radio node at the same time may be considered in Step S1470. That is, the new active link may be selected by trying to spread links as much as possible among available server radio nodes, so as to ensure that the total number of active links that can actually transfer data at the same time is the highest. For example, if a server radio node serves two client radio nodes at the same time while another server radio node serves no client radio node, then it might be more efficient that each server radio node serves one client radio node, so that two links could transfer data simultaneously without sharing resources of one single server radio node. The new link formed in this way may be selected as the new active link.

Figure 17:
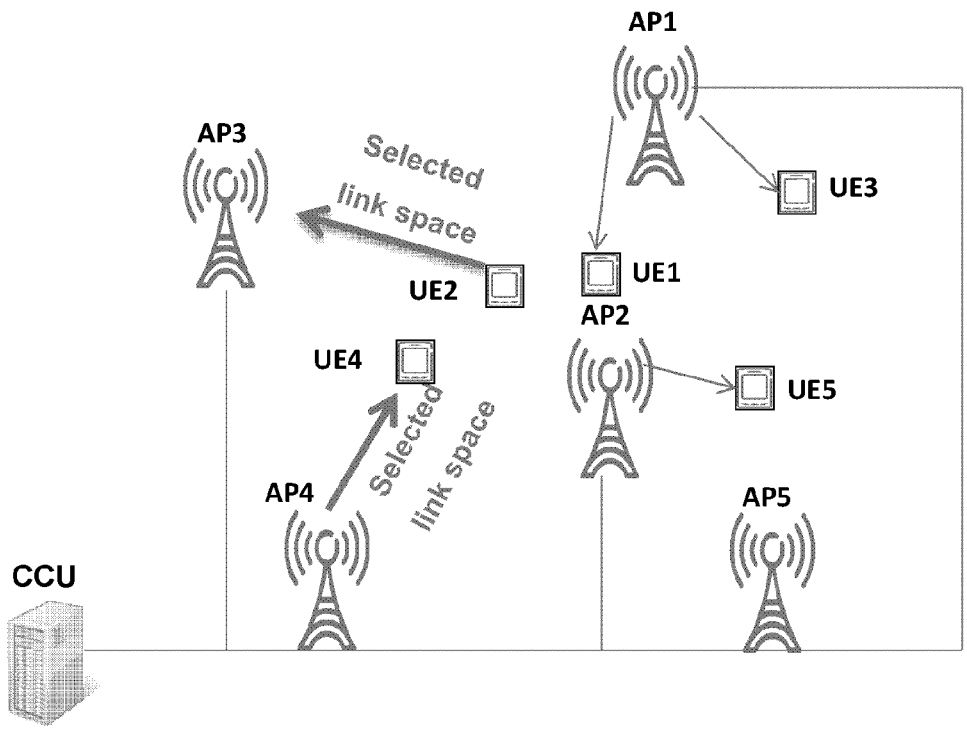
FIG. 17 shows a schematic diagram illustrating an exemplary link arrangement as a result of step S1470 according to the present disclosure

FIG. 17 shows a schematic diagram illustrating an exemplary link arrangement as a result of step S1470 according to the present disclosure.

As shown in FIG. 17, the candidate link from UE2 to AP3 and the candidate link from AP4 to UE4 are selected for replacing the active link from UE2 to AP2 and the active link from AP3 to UE4, respectively.

One major advantage with the method 1400 and its various variants is receiving nodes of all links (including not only active links but also respective candidate links) may be in a directional sensing state when the transmitting nodes of the all links are sending directional sounding signals. This can result in an extended DLIM, which can be used for providing a better link arrangement, e.g., illustrated in FIG. 17. With such an extended DLIM, the present disclosure can efficiently achieve spatial reuse benefit inherited from high gain beamforming.

Figure 18:
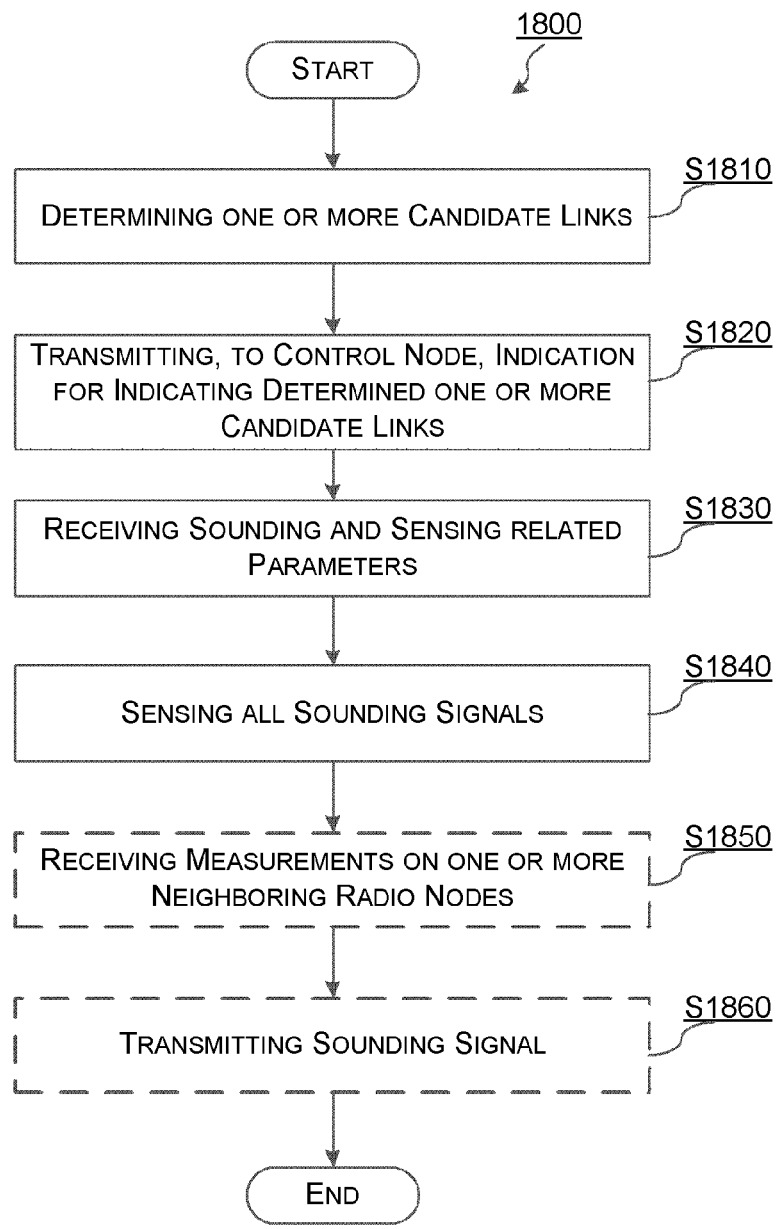
FIG. 18 shows a flowchart of a method 1800 used in a radio node under control of a control node according to embodiments of the present disclosure.

FIG. 18 shows a flowchart of a method 1800 used in a radio node under control of a control node, e.g., e.g., CCU 600 in FIG. 6, according to embodiments of the present disclosure. The radio node serves at least one client radio node. That is, the radio node here refers to a server radio node of its corresponding client radio nodes. The server radio node may be, e.g., any AN as depicted in FIG. 6. For example, if a client radio node is UE 660, then the server radio node is AP 620. It is also possible that a UE may play a role of a server radio node when the UE serves as a hot point and serves other UEs. In this case, the server radio node is the UE, and client radio nodes may be other UEs served by the UE. To put it differently, the server radio node here may be either a transmitting node or a receiving node of a link, either an active link or a candidate link.

At step S1810, the server radio node determines one or more candidate links between the client radio node and another radio nodes, e.g., candidate links as shown in FIG. 15. The server radio node may determine the one or more candidate links based on, e.g., a position of the client radio node. For example, if the serving radio node knows locations in space (e.g., using a Global Position System (GPS)) of the client radio node and neighboring server radio nodes, it can determine distances between the client radio node and neighboring server radio nodes which could provide candidate link(s). Alternatively, the client radio node may report an estimated direction/distance between itself and neighboring server radio nodes to the server radio node, which in turn determines a set of suitable candidate link(s). A threshold may be applied on the distance to avoid radio nodes located too far.

It is also possible for the server radio node to determine the candidate links by applying spatial diversity (e.g., angular diversity) to limit interference in a beamforming system. Taking the layout as illustrated FIG. 13 for illustration and assuming there is no active link between UE2 and AP2, if it is to select two candidate links for UE2, it is to make a selection among AP2, AP3, AP4 and AP5 for forming candidate links with UE2. As illustrated in FIG. 13, links (UE2 to AP2) and (UE2 to AP5) are closely related in space, and thus they will be similarly interfered by the link (AP1 to UE1). In view of this, as an example, links (UE2 to AP2) and (UE2 to AP3) may be selected as two candidate links. This is because these two links have the best angular diversity (i.e., there is the maximum angle therebetween), and thereby the interference from the link (AP1 to UE1) will be received very differently for these two candidate links. It is also possible to select links (UE2 to AP2) and (UE2 to AP4) or links (UE2 to AP3) and (UE2 to AP4) as the two candidate links.

At step S1820, the server radio node transmits, to the control node, an indication for indicating the determined one or more candidate links.

Consequently, steps S1810 and S1820 form a variant of the method 1400 in terms of determining one or more candidate links. To be specific, with the method 1800, the one or more candidate links are determined at the server radio node side, while the method 1400 determines the one or more candidate links at the network side.

At step S1830, the server radio node receives, from the control node, sounding and sensing related parameters for each of the active link and the determined one or more candidate links. The received sounding and sensing related parameters include dedicated sounding and sensing related parameters for the link and common sounding and sensing related parameters for all of the determined one or more candidate links and all active links under control of the network. The common sounding and sensing related parameters include a sounding and sensing period and a sounding and sensing interval. This step may be performed in a similar manner with step S910 or S1110.

For example, the sounding and sensing related parameters may be illustrated by FIG. 10 and/or FIG. 12. Then, the sounding and sensing period may be denoted as DSSP and the sounding and sensing interval may be indicated by DSSI.

In an implementation, the dedicated sounding and sensing related parameters for each of the active link and the determined one or more candidate links comprise a sounding resource parameter for specifying a resource unit for the radio node transmitting the sounding signal, the specified resource unit being in terms of at least one or more of: time, frequency and code. For example, the specified resource unit here may be SRU as shown in FIG. 10 or FIG. 12.

In an implementation, the common sounding and sensing related parameters further include: a rule for the radio node reporting the one or more results of sensing sounding signals to the control node when the radio node serves as a receiving node of the link.

At step S1840, the server radio node senses, for each of the active link and the determined one or more candidate links, all sounding signals in a direction of the link based on the received sounding and sensing related parameters and reporting one or more sensing results to the control node, when the radio node serves as a receiving node of the link. This step may be performed in a similar manner with step S920.

The method 1800 may optionally include step S1850. At step S1850, the server radio node receives, from the client radio node, measurements on one or more neighboring radio nodes of the radio node. By using the received measurements, the server radio node may determine the one or more candidate links.

The method 1800 may optionally include step S1860. At step S1860, the server radio node transmits, for each of the active link and the determined one or more candidate links, a sounding signal in a direction of the link based on the sounding and sensing related parameters, when the radio node serves as a transmitting node of the link. This step may be performed in a similar manner with step S1120.

Based on the DLIM or the extended DLIM, the network can at least:
  optimize the spatial reuse by redirecting the direction of a link;
  mitigate the interference via one or more of coordinated scheduling, coordinated beamforming and coordinated blanking;
  optimize/adapt the resource allocation scheme and/or parameters; or
  optimize/adapt the link adaptation scheme and/or parameters.

The DLIM/the extended DLIM may be used for resource allocation optimization for both scheduling based resource allocation and contention based resource allocation.

The present disclosure further proposes a self-optimization/configuration method for ADSS. To be specific, the present disclosure proposes to enable/disable ADSS for a specific link depending on one or more link related parameters of the link. In other words, instead of performing ADSS for all links, the present disclosure proposes to selectively apply ADSS for a link based on a probability that the link would generate and/or experience larger interference. This may reduce overhead of ADSS without at the cost of clear performance loss.

For example, the one or more link related parameters may be any one of:
  a geometry related parameter of a client radio node of the link;
  a data rate of the link;
  system load of the serving radio node; or
  a victim ratio representing a ratio of links to be interfered among the one or more links.

Figure 19:
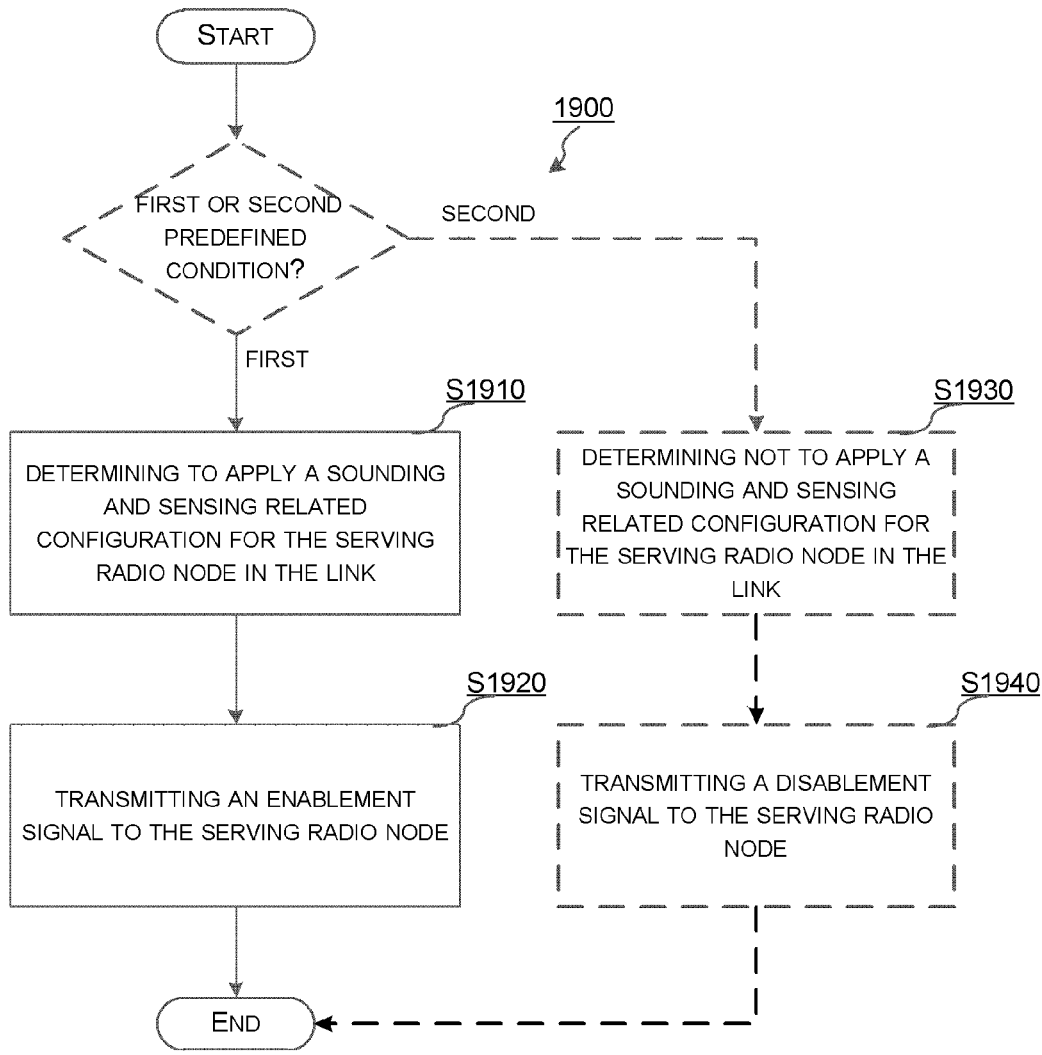
FIG. 19 shows a flowchart of a method 1900 used in a control node according to embodiments of the present disclosure.

FIG. 19 shows a flowchart of a method 1900 performed in a control node, e.g., CCU 600 in FIG. 6, according to embodiments of the present disclosure. The control node controls a serving radio node, e.g., AP 610 in FIG. 6, which serves one or more client radio nodes, such as UE 650, which are connected to the serving radio node via one or more links such as Link 1 as shown in FIG. 6. To be specific, the method 1900 is used for enabling/disabling ADSS at network side.

As shown in FIG. 19, the control node may firstly determine whether at least one link related parameter of each link of the one or more links satisfies a first predefined condition or a second predefined condition. It should be noted that the method 1900 may be performed link by link.

At step S1910, the control node determines to apply a sounding and sensing related configuration (also referred to as an ADSS configuration) for the serving radio node in the link, if at least one link related parameter of the link satisfies the first predefined condition.

At step S1920, the control node transmits an enablement signal to the serving radio node. The enablement signal indicates enabling application of the sounding and sensing related configuration in the link. That is, after receiving the enablement signal, the serving radio node will apply the sounding and sensing related configuration in the concerned link.

Optionally, the method 1900 may further include steps S1930 and S1940.

At step S1930, the control node determines not to apply a sounding and sensing related configuration for the serving radio node in the link, if the at least one link related parameter of the link satisfies the second predefined condition.

At step S1940, the control node transmits a disablement signal to the serving radio node. The disablement signal indicates disabling the application of the sounding and sensing related configuration in the link. In other words, after receiving the disablement signal, the serving radio node will stop applying ADSS in the concerned link. For example, if there is ADSS currently applied in the link, the serving radio node will stop the use of the ADSS in response to receipt of the disablement link.

In a first implementation, the at least one link related parameter of the link includes a geometry related parameter (simply referred to as a geometry hereafter) of a client radio node of the link. The second predefined condition is that the geometry related parameter is larger than a first predefined threshold. The first predefined condition is that the geometry related parameter is smaller than a fifth predefined threshold. The first predefined threshold or the fifth predefined threshold may be predefined or preconfigured by the control node for bounding the geometry related parameter.

The geometry related parameter may be based on a discovery signal strength and/or quality of the serving radio node or a difference between the discovery signal strength and/or quality of the serving radio node and that of the strongest neighboring radio node.

Considering the mandatory use of high gain beamforming, in which the vertical beamforming and horizontal beamforming are combined, the beam tilt of a beam to center UE will be large and it is less likely that a center link (the corresponding client is in the center coverage area of the serving AP) served by one AP will create major interference to an edge link (the corresponding client is at the coverage edge of its serving AP) served by a neighbor AP.

If the geometry of a link is higher than a high threshold (i.e., the first predefined threshold), the link may be determined to be a center link and it is not selected for ADSS, i.e., no ADSS is configured for the link. This may mean five aspects: 1) no SRU is configured for the link; 2) no directional sounding signal is transmitted for the link; 3) no directional sensing is performed for the link; 4) no sounding report for the link; and 5) the link is not included in the DLIM or the extended DLIM.

If the geometry of a link is lower than a low threshold (i.e., the fifth predefined threshold), the link may be determined to be an edge link and it is selected for ADSS, i.e., ADSS is configured for the link. This may mean five aspects as follows: 1) SRU is configured for the link; 2) directional sounding signal is transmitted for the link; 3) directional sensing is performed for the link; 4) sounding report for is generated for the link; and 5) the link is included in the DLIM or the extended DLIM.

It should be noted that the high threshold and the low threshold here are relative with respect to each other, and the present disclosure is not limited to their specific values only if the first predefined threshold is larger than or even equal to the fifth predefined threshold.

Figure 20:
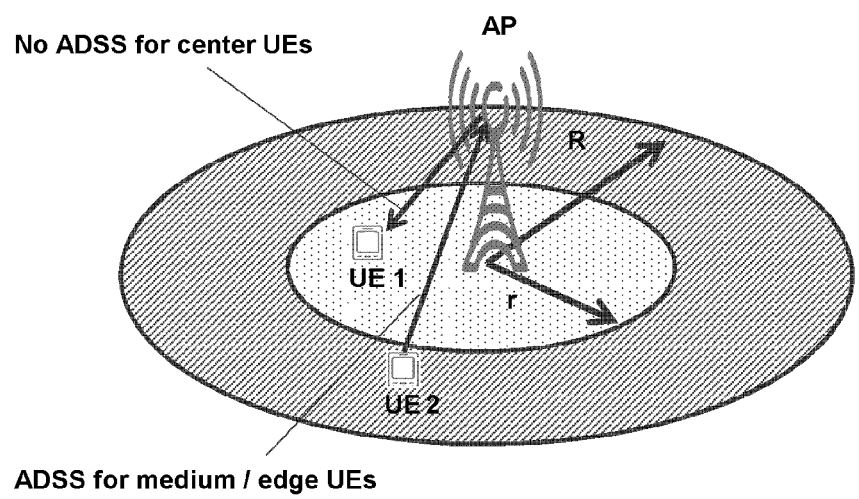
FIG. 20 illustrates an example for illustrating geometry based link selection for ADSS according to the present disclosure.

FIG. 20 illustrates an example for illustrating geometry based link selection for ADSS according to the present disclosure. In this example, the geometry is determined based on locations of nodes.

As shown in FIG. 20, for a link from AP to UE1 within the center coverage (denoted as a dotted area in FIG. 20), ADSS should not be applied for the link. Then, the control node will transmit a disablement signal to the serving radio node to indicate disabling the application of the sounding and sensing related configuration in the link, i.e., to turn off ADSS for the link, if the ADSS is enabled for the link before.

For a link from AP to UE2 at the coverage medium or edge (denoted as a dashed area in FIG. 20), ADSS should be applied. In this case, the control node will transmit an enablement signal to the serving radio node to indicate enabling application of the sounding and sensing related configuration in the link, i.e., to turn on ADSS for the link, if ADSS is disabled for the link before.

With the first implementation, the overhead can be reduced from, e.g., the following two aspects. In the first aspect, less links are configured for ADSS compared to a case when all links are configured for ADSS, so shorter DSSI may be configured. In the second aspect, the beam switch frequency in relation to the serving AP for an edge link is much lower than that for a center link. Assuming the same moving speed for a center link and an edge link, the maximum angular speed for medium or edge links is much smaller than that of center links due to the difference of the distances from corresponding clients to the serving AP.

In a second implementation, the at least one link related parameter of the link includes a data rate of the link. The second predefined condition is that the data rate is smaller than a second predefined threshold. The first predefined condition is that the data rate of the link is larger than a sixth predefined threshold. The second predefined threshold or the sixth predefined threshold may be predefined or preconfigured by the control node for bounding the data rate.

To be specific, a high data rate for one link may mean at least one of the following: frequent transmission, many radio resources for data transmission, and high transmission power in order for high SINR. A low data rate for the link means the contrary. Hence, it may be not necessary to perform ADSS for a link with a low enough data rate.

To do this, if a data rate of a link is smaller than a low data rate threshold (i.e., the second predefined threshold), ADSS should not be applied for this link, e.g., ADSS is turned off for the link. In a case when an ADSS configuration is currently applied for this link, the ADSS configuration may be cancelled. If the data rate of the link is higher than a high data rate threshold (i.e., the sixth predefined threshold), ADSS should be applied for the link, e.g., ADSS is turned on. For example, ADSS may be turned on if an ADSS configuration has been provided.

It should be noted that the high data rate threshold and the low data rate threshold here are relative with respect to each other, and the present disclosure is not limited to their specific values only if the second predefined threshold is not larger than the sixth predefined threshold. In an extremely case, the second and sixth predefined thresholds may be configured to the same value.

In a third implementation, the at least one link related parameter of the link includes a system load of the serving radio node. The second predefined condition is that the system load is smaller than a third predefined threshold. The first predefined condition is that the system load is higher than a seventh predefined threshold. The third predefined threshold or the seventh predefined threshold may be predefined by the control node for bounding the system load.

Hereinafter, the system load of the serving radio node refers to system load of one AP cluster hosted by the serving radio node. The AP cluster may refer to a collection including an AP and all ANs served by the AP. Taking AP3 in FIG. 5 as an example of the serving radio node, its AP cluster may include AP3, UE3 and UE4.

As an example, the system load may be evaluated by using either the average number of links per AP or the average data rate per AP.

In this implementation, if the system load is lower than a low load threshold (i.e., the third predefined threshold, which may be extremely low sometimes), ADSS may be disabled for the AP cluster covered by the serving radio node. If the system load is higher than a high load threshold (i.e., the seventh predefined threshold), ADSS may be enabled for the AP cluster.

For example, considering system load of an AP serving an office building, which should fall off dramatically during the night or at the weekend, ADSS can be disabled in these time periods.

In a fourth implementation, the at least one link related parameter of the link includes a victim ratio representing a ratio of links to be interfered among the one or more links. The second predefined condition is that the victim radio is smaller than a fourth predefined threshold. The first predefined condition is that the victim ratio is larger than an eighth predefined threshold. The fourth predefined threshold or the eighth predefined threshold may be predefined or preconfigured by the control node for bounding the victim radio.

Herein, the victim radio is used to represent collision situation, and other appropriate parameters representing collision situation may be also applied in this implementation. Usually, the control node may record the statistics of collisions in the system or AP cluster. In this way, the victim radio may be obtained by the control node.

According to this implementation, the victim ratio may be formulated as:

$$R_{col} = \frac{N_{vic}}{N_{tot}},$$

wherein $N_{vic}$ is the number of victim links and $N_{tot}$ is the total number of link configured for ADSS.

Then, If $R_{col}$ is lower than the fourth predefined threshold (e.g., an extremely low threshold), the ADSS should be disabled (not applied) for the system or AP cluster, e.g., ADSS is turned off. Otherwise, If $R_{col}$ is higher than the eighth threshold (e.g., a relatively higher threshold), the ADSS can be enabled (applied) for the system or AP cluster, e.g., ADSS is turned on.

When the ADSS is enabled for the system or AP cluster, the victim ratio link(s) may be identified explicitly via the DLIM/the extended DLIM. While when the ADSS is disabled for the system or AP cluster, the victim link(s) cannot be explicitly identified since the DLIM/the extended DLIM does not exist. In this case, the link quality may be used to roughly identify the victim link. For instance, a link can be determined as a victim link if its link SINR is lower than a predefined SINR threshold. That is, a link to be interfered has a link SINR lower than a predefined SINR threshold.

Figure 21:
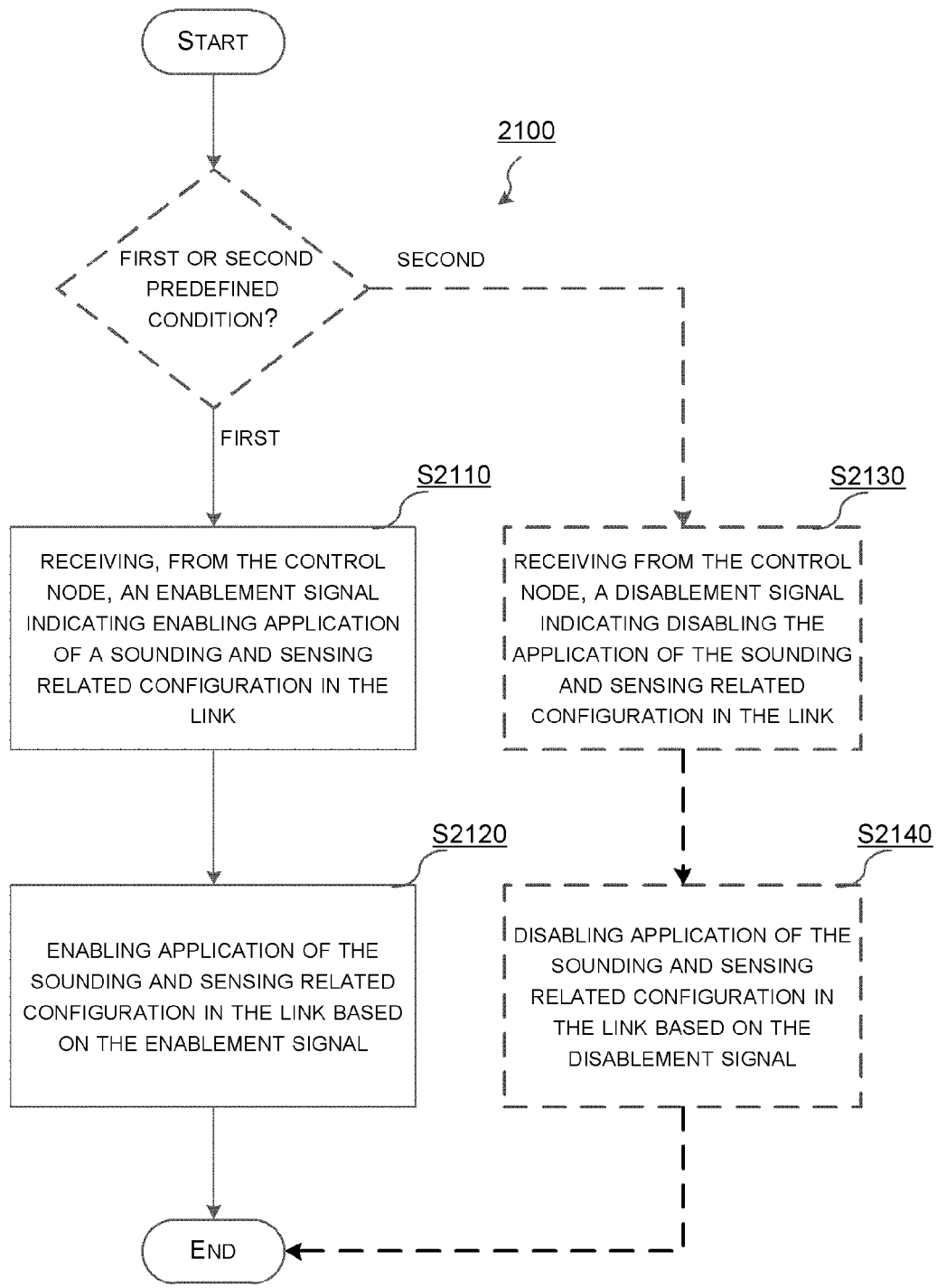
FIGS. 21 and 22 show a flowchart of a method 2100 performed in a serving radio node according to embodiments of the present disclosure.

FIG. 21 shows a flowchart of a method 2100 performed in a serving radio node, e.g., AP 610 in FIG. 6, according to embodiments of the present disclosure. The serving radio node is under control of a control node and serves one or more client radio nodes which are connected to the serving radio node via one or more links. For example, when the serving radio node is AP 610 in FIG. 6, the control node should be CCU 600 in FIG. 6, the one or more client radio nodes served by the serving radio node is e.g., UE 650, and the one or more links may be Link 1 as shown in FIG. 6. To be specific, the method 2100 is used for enabling/disabling ADSS at a serving radio node side, corresponding to the method 1900 at a control node side.

At step S2110, the serving radio node receives an enablement signal from the control node, if at least one link related parameter of the link satisfies a first predefined condition. The enablement signal indicates enabling application of a sounding and sensing related configuration in each of the one or more links.

At step S2120, the serving radio node enables application of the sounding and sensing related configuration in the link based on the enablement signal.

Optionally, the method 2100 may further include steps S2130 and S2140.

At step S2130, the serving radio node receives a disablement signal from the control node, if the at least one link related parameter of the link satisfies a second predefined condition. The disablement signal indicates disabling the application of the sounding and sensing related configuration in the link.

At step S2140, the serving radio node disables application of the sounding and sensing related configuration in the link based on the disablement signal.

Figure 22:
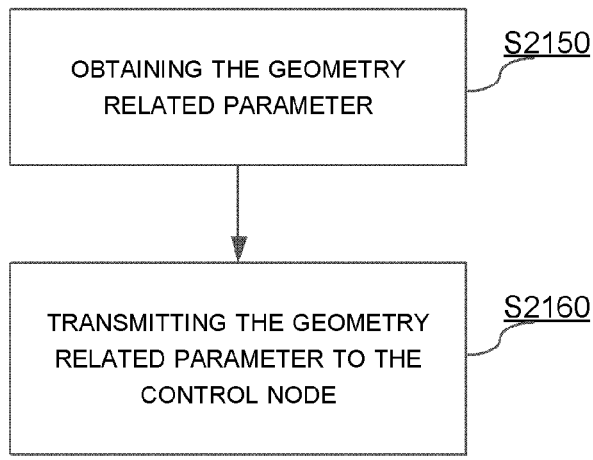

As the method 2100 corresponds to the method 1900, the first to the fourth implementations of the method 1900 may be correspondingly applied in the method 2100. In addition to all details as mentioned in the first to the fourth implementations of the method 1900, the method 2100 may optionally further include steps 2150 and 2160 in the first implementation, i.e., the at least one link related parameter of the link includes a geometry related parameter of a client radio node of the link, as shown in FIG. 22.

At step S2150, the serving radio node obtains the geometry related parameter. At step S2160, the serving radio node transmits the geometry related parameter to the control node.

With the method 1900 or the method 2100, the present disclosure can selectively turn on/off ADSS functionality, thereby reducing the overhead of ADSS and optimizing the interference sounding and sensing performance.

The present disclosures further proposes to adapt an ADSS configuration (i.e., a sounding and sensing related configuration) for a serving radio node to be applied in a specific link based on one or more link related parameters of the link. In other words, instead of using a fixed configuration for ADSS (e.g., (e.g., a fixed DSSP, a fixed DSSI and the like), the ADSS related parameters are adapted according to various conditions to reduce the ADSS overhead and optimize the system performance. As compared to using a fixed configuration for ADSS, which might face considerable overhead of ADSS caused by dynamically varying factors related to links, adapting the ADSS configuration may reduce the overhead of ADSS.

For example, the one or more link related parameters may be any one of:
  system load of the serving radio node; or
  statistics on beam switch intervals of the one or more links, which may, e.g., depend on a moving speed of the corresponding client radio node.

Figure 23:
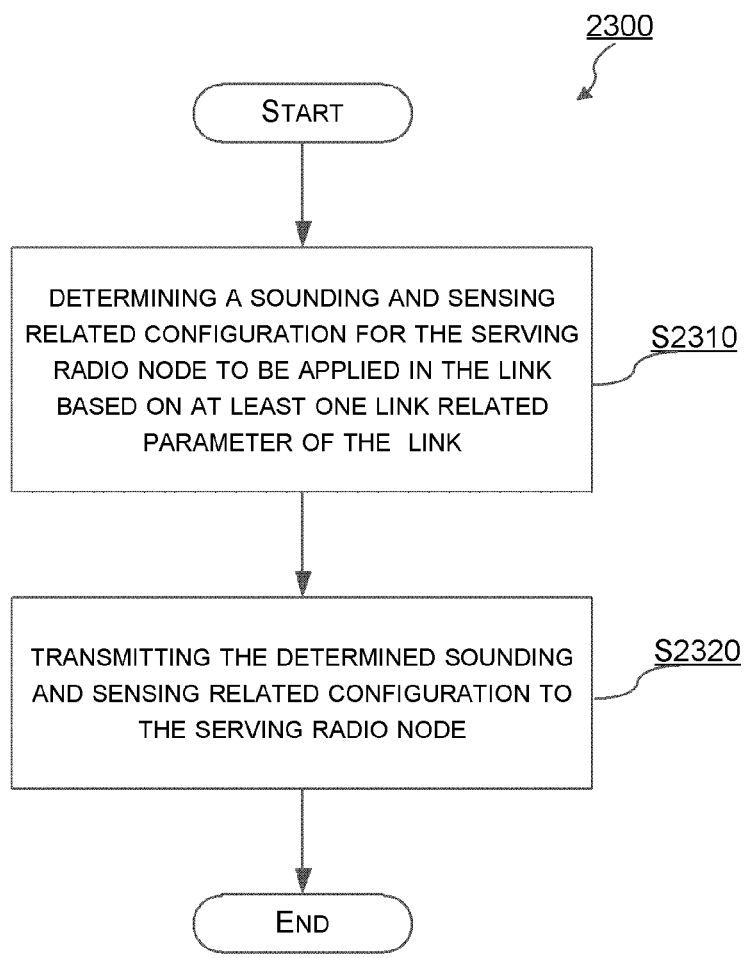
FIGS. 23 and 25 show a flowchart of a method 2300 performed in a control node according to embodiments of the present disclosure.

FIG. 23 is a flowchart of a method 2300 performed in a control node, e.g., CCU 600 in FIG. 6, according to embodiments of the present disclosure. The control node controls a serving radio node, e.g., AP 610 in FIG. 6, which serves one or more client radio nodes, such as UE 650, which are connected to the serving radio node via one or more links such as Link 1 as shown in FIG. 6. To be specific, the method 2300 is used for adapting ADSS related parameters, e.g., DSSI or DSSP based on various link related parameters.

At step S2310, the control node determines a sounding and sensing related configuration for the serving radio node to be applied in each link of the one or more links, based on at least one link related parameter of the link.

At step S2320, the control node transmits the determined sounding and sensing related configuration to the serving radio node.

In an implementation, the at least one link related parameter of the link includes a system load of the serving radio node. As an example, the sounding and sensing related configuration includes a sounding and sensing duration (i.e., DSSI, e.g., as shown in FIG. 8), during which the one or more client radio nodes perform sounding and sensing. In this example, step S2310 may be implemented by determining DSSI based on the system load.

The system load may be evaluated by using, e.g., the average number of links per AP or the average data rate per AP. A DSSI to system load mapping table may be predefined and the control node may semi-statically configure DSSI based on the system load by looking up the table.

According to this implementation, DSSI may be directly proportional to the system load. For instance, a small DSSI may be configured for a low system load case, a medium DSSI may be configured for a medium system load case, and a larger DSSI may be configured for a high system load case. It should be appreciated that "small," "medium" and "larger" occurring here is intended to be used relatively.

As an example, considering system load of an AP serving an office building, which should fall off dramatically during the night or at the weekend, DSSI may be adapted correspondingly in these time periods. For example, the control node may configure a large DSSI for busy hours (high system load) and a small DSSI for low system load hours.

In another implementation, the at least one link related parameter of the link includes statistics on beam switch intervals of the one or more links. As an example, the sounding and sensing related configuration includes a sounding and sensing period (i.e., DSSP, e.g., as shown in FIG. 8). In this example, step S2310 may be implemented by determining DSSP based on the statistics on beam switch intervals.

A beam switch interval refers to a time duration switching from the last beam to another beam. The beam switch intervals of the one or more links may be recorded by the control node, and then the optimal length for DSSP may be derived based thereon. For example, the control node may generate one beam switch CDF based on the beam switch statistics of all links configured for ADSS and then determine DSSP according to the x-percentile beam switch interval in the CDF curve.

Figure 24:
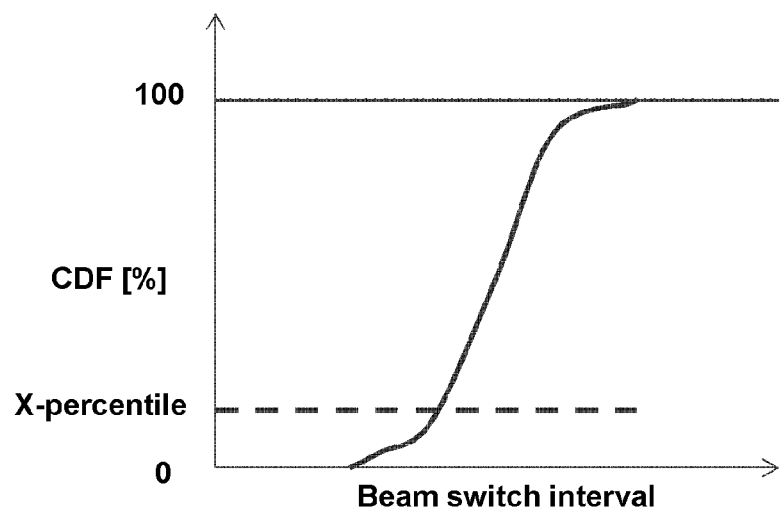
FIG. 24 shows an exemplary Cumulative Distribution Function (CDF) for beam switch intervals according to the present disclosure.

FIG. 24 shows an exemplary CDF for beam switch intervals according to the present disclosure. As illustrated, DSSP may be determined to be the beam switch interval at x-percentile point (e.g., 5% point).

Figure 25:
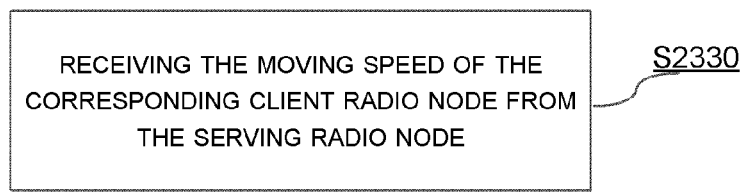

As an example of this implementation, a beam switch interval of each of the one or more links is dependent on a moving speed of the corresponding client radio node. In this example, the method 2300 may further include step S2330 as shown in FIG. 25. As illustrated, the control node receives the moving speed of the corresponding client radio node from the serving radio node, at step S2330.

For example, the higher moving speed for a client radio node may mean the higher beam switch frequency, which means that the link direction of the client radio node could change faster. In this case, DSSP shall be short enough so that the ADSS frequency could be higher than the beam switch frequency.

Figure 26:
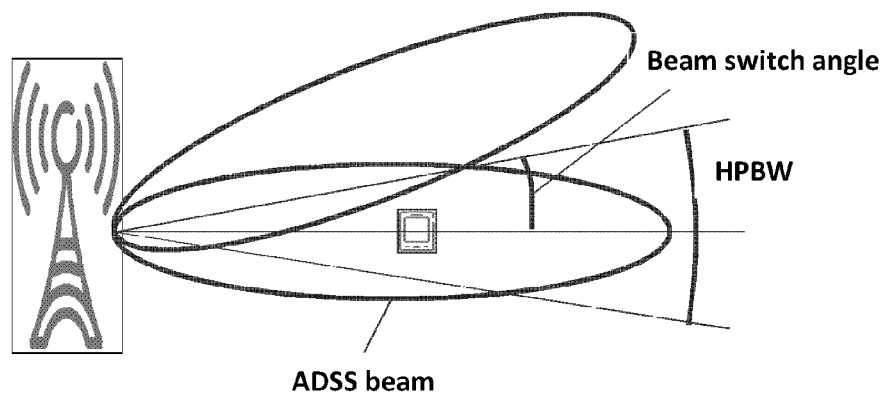
FIG. 26 illustrates an exemplary beam switch angle according to the present disclosure.

FIG. 26 illustrates an exemplary beam switch angle according to the present disclosure. In this example, assume that a moving speed of a client radio node is v and a distance from the client radio node to its serving AP is r, then the angular speed of the client radio node is v/r. It is further assumed that the beam lobe width is W and the client radio node is at the center position of a beam. Then, as shown in FIG. 24, the shortest time for a beam switch is:

$$T_{min} = \frac{w/2}{v/r} = \frac{wr}{2v}.$$

The DSSP shall be shorter than $T_{min}$ as:

$$DSSP = k \cdot T_{min} = k \cdot \frac{wr}{2v},$$

where k is a preconfigured coefficient between 0 and 1.

As a non-limiting example, DSSP may be inversely proportional to the moving speed of the client radio node.

A mapping table between the moving speed and DSSP may be predefined at the control node, which then may look up the table for DSSP according to, e.g., the highest moving speed or the average moving speed of certain ratio of client radio nodes with high moving speed in the system.

With the method 2300, the present disclosure can adapt one or more ADSS related parameters (instead of using a fixed configuration for ADSS) according to various conditions. This can reduce ADSS overhead and optimize system performance.

Figure 27:
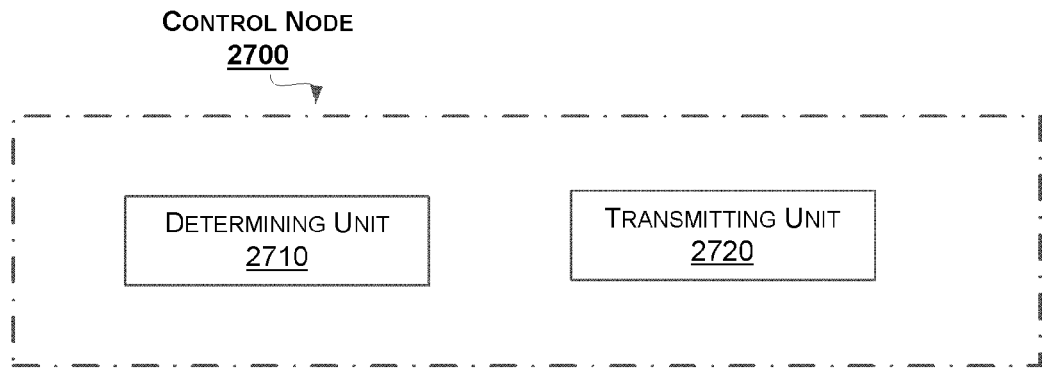
FIG. 27 is a schematic block diagram of a control node 2700 according to embodiments of the present disclosure.

FIG. 27 is a schematic block diagram of a control node 2700 according to embodiments of the present disclosure. The control node 2700 could be e.g. CCU 600 as shown in FIG. 6. Of course, the control node 2700 is not limited thereto, but may be other appropriate entities, which are responsible for parameter configurations and coordination among ANs as well as controlling links among ANs in any wireless system or cellular network, especially for enabling/disabling ADSS.

As shown in FIG. 27, the control node 2700 includes a determining unit 2710 and a transmitting unit 2720.

The determining unit 2710 is configured to determine apply a sounding and sensing related configuration for the serving radio node in each link of the one or more links, if at least one link related parameter of the link satisfies a first predefined condition.

The transmitting unit 2720 is configured to transmit an enablement signal to the serving radio node. The enablement signal indicates enabling application of the sounding and sensing related configuration in the link.

Alternatively, the determining unit 2710 may be configured to determine not to apply a sounding and sensing related configuration for the serving radio node in the link, if the at least one link related parameter of the link satisfies a second predefined condition. In this case, the transmitting unit 2720 may be configured to transmit a disablement signal to the serving radio node. The disablement signal indicates disabling the application of the sounding and sensing related configuration in the link.

In a first implementation, the at least one link related parameter of the link includes a geometry related parameter (simply referred to as a geometry hereafter) of a client radio node of the link. The first predefined condition is that the geometry related parameter is smaller than a fifth predefined threshold. The second predefined condition is that the geometry related parameter is larger than a first predefined threshold. The first predefined threshold or the fifth predefined threshold may be predefined or preconfigured by the control node for bounding the geometry related parameter.

The geometry related parameter may be based on a discovery signal strength and/or quality of the serving radio node or a difference between the discovery signal strength and/or quality of the serving radio node and that of the strongest neighboring radio node.

If the geometry of a link is higher than a high threshold (i.e., the first predefined threshold), the link may be determined to be a center link and it is not selected for ADSS, i.e., no ADSS is configured for the link. This may mean five aspects: 1) no SRU is configured for the link; 2) no directional sounding signal is transmitted for the link; 3) no directional sensing is performed for the link; 4) no sounding report for the link; and 5) the link is not included in the DLIM or the extended DLIM.

If the geometry of a link is lower than a low threshold (i.e., the fifth predefined threshold), the link may be determined to be an edge link and it is selected for ADSS, i.e., ADSS is configured for the link. This may mean five aspects as follows: 1) SRU is configured for the link; 2) directional sounding signal is transmitted for the link; 3) directional sensing is performed for the link; 4) sounding report for is generated for the link; and 5) the link is included in the DLIM or the extended DLIM.

It should be noted that the high threshold and the low threshold here are relative with respect to each other, and the present disclosure is not limited to their specific values only if the first predefined threshold is larger than or even equal to the fifth predefined threshold.

In a second implementation, the at least one link related parameter of the link includes a data rate of the link. The first predefined condition is that the data rate of the link is larger than a sixth predefined threshold. The second predefined condition is that the data rate is smaller than a second predefined threshold. The second predefined threshold or the sixth predefined threshold may be predefined or preconfigured by the control node for bounding the data rate.

According to this implementation, if a data rate of a link is smaller than a low data rate threshold (i.e., the second predefined threshold), ADSS should not be applied for this link, e.g., ADSS is turned off. In a case when an ADSS configuration is currently applied for this link, the ADSS configuration may be cancelled. If the data rate of the link is higher than a high data rate threshold (i.e., the sixth predefined threshold), ADSS should be applied for the link, e.g., ADSS is turned on. For example, ADSS may be turned on if an ADSS configuration has been provided.

It should be noted that the high data rate threshold and the low data rate threshold here are relative with respect to each other, and the present disclosure is not limited to their specific values only if the second predefined threshold is not larger than the sixth predefined threshold. In an extremely case, the second and sixth predefined thresholds may be configured to the same value.

In a third implementation, the at least one link related parameter of the link includes a system load of the serving radio node. The first predefined condition is that the system load is higher than a seventh predefined threshold. The second predefined condition is that the system load is smaller than a third predefined threshold. The third predefined threshold or the seventh predefined threshold may be predefined or preconfigured by the control node for bounding the system load.

As an example, the system load here may be evaluated by using either the average number of links per AP or the average data rate per AP.

In this implementation, if the system load is lower than a low load threshold (i.e., the third predefined threshold, which may be extremely low in some times), ADSS may be disabled for the AP cluster covered by the serving radio node. If the system load is higher than a high load threshold (i.e., the seventh predefined threshold), ADSS may be enabled for the AP cluster.

For example, considering system load of an AP serving an office building, which should fall off dramatically during the night or at the weekend, ADSS can be disabled in these time periods.

In a fourth implementation, the at least one link related parameter of the link includes a victim ratio representing a ratio of links to be interfered among the one or more links. The first predefined condition is that the victim ratio is larger than an eighth predefined threshold. The second predefined condition is that the victim radio is smaller than a fourth predefined threshold. The fourth predefined threshold or the eighth predefined threshold may be predefined or preconfigured by the control node for bounding the victim radio.

Herein, the victim radio is used to represent collision situation, and other appropriate parameters representing collision situation may be also applied in this implementation. Usually, the control node may record the statistics of collisions in the system or AP cluster. In this way, the victim radio may be obtained by the control node.

According to this implementation, the victim ratio may be formulated as:

$$R_{col} = \frac{N_{vic}}{N_{tot}},$$

wherein $N_{vic}$ is the number of victim links and $N_{tot}$ is the total number of link configured for ADSS.

Then, If $R_{col}$ is lower than the fourth predefined threshold (e.g., an extremely low threshold), the ADSS should be disabled (not applied), e.g., ADSS is turned off. Otherwise, If $R_{col}$ is higher than the eighth threshold (e.g., a relatively higher threshold), the ADSS can be enabled (applied) for the system or AP cluster, e.g., ADSS is turned on.

When the ADSS is enabled, the victim ratio may be identified explicitly via the DLIM/the extended DLIM. When the ADSS is disabled, the victim link cannot be explicitly identified since the DLIM/the extended DLIM does not exist. In this case, the link quality may be used to roughly identify the victim link. For instance, a link can be determined as a victim link if its link SINR is lower than a predefined SINR threshold. That is, a link to be interfered has a link SINR lower than a predefined SINR threshold.

Figure 28:
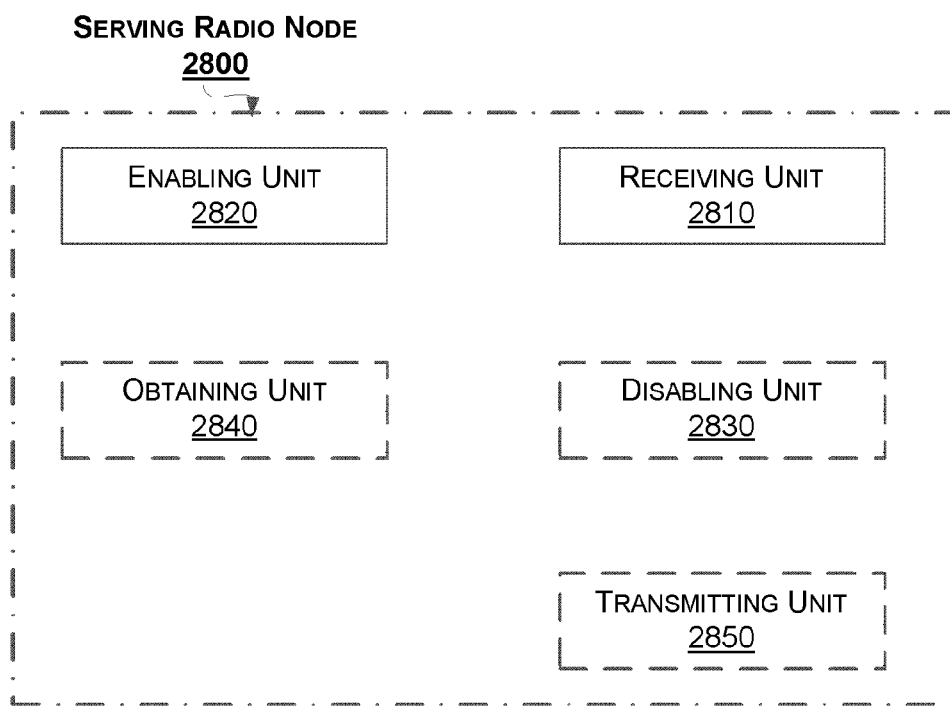
FIG. 28 is a schematic block diagram of a serving radio node 2800 according to embodiments of the present disclosure.

FIG. 28 is a schematic block diagram of a serving radio node 2800 under control of a control node, e.g., CCU 600 in FIG. 6, in a wireless communication network according to embodiments of the present disclosure. The radio node 2800 serves one or more client radio nodes. The serving radio node 2800 may be, e.g., any AN as depicted in FIG. 6. For example, if a client radio node is UE 660, then the serving radio node 2800 refers to AP 620. It is also possible that a UE may play a role of a serving radio node when the UE serves as a hot point and serves other UEs. In this case, the serving radio node 2800 is the UE, and client radio nodes may be other UEs served by the UE. To be specific, the serving radio node 2800 is used for enabling/disabling ADSS, corresponding to the control node 2700.

As shown in FIG. 28, the serving radio node 2800 includes a receiving unit 2810, an enabling unit 2820, and a disabling unit 2830. The disabling unit 2830 is optional.

The receiving unit 2810 is configured to receive an enablement signal from the control node, if at least one link related parameter of the link satisfies a first predefined condition. The enablement signal indicates enabling application of a sounding and sensing related configuration in each of the one or more links.

The enabling unit 2820 is configured to enable application of the sounding and sensing related configuration in the link based on the enablement signal.

Alternatively, the receiving unit 2810 may be further configured to receive a disablement signal from the control node, if the at least one link related parameter of the link satisfies a second predefined condition. The disablement signal indicates disabling the application of the sounding and sensing related configuration in the link. Then, the disabling unit 2830 is configured to disable application of the sounding and sensing related configuration in the link based on the disablement signal.

As the serving radio node 2800 corresponds to the control node 2700, the first to the fourth implementations of the control node 2700 may be correspondingly applied in the serving radio node 2800. In addition to all details as mentioned in the first to the fourth implementations of the control node 2700, the serving radio node 2800 may optionally further include an obtaining unit 2840 and a transmitting unit 2850 in the first implementation, i.e., the at least one link related parameter of the link includes a geometry related parameter of a client radio node of the link.

The obtaining unit 2840 is configured to obtain the geometry related parameter. The transmitting unit 2850 is configured to transmit the geometry related parameter to the control node.

Figure 29:
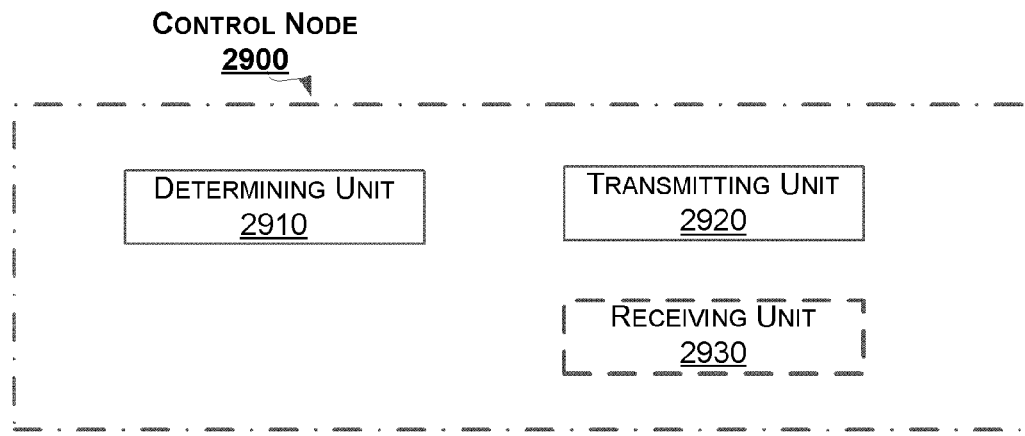
FIG. 29 is a schematic block diagram of a control node 2900 according to embodiments of the present disclosure.

FIG. 29 is a schematic block diagram of a control node 2900 according to embodiments of the present disclosure. The control node 2900 could be e.g. CCU 600 as shown in FIG. 6. Of course, the control node 2900 is not limited thereto, but may be other appropriate entities, which are responsible for parameter configurations and coordination among ANs as well as controlling links among ANs in any wireless system or cellular network, especially for adapting ADSS related parameters, e.g., DSSI or DSSP based on various link related parameters.

As shown in FIG. 29, the control node 2900 includes a determining unit 2910 and a transmitting unit 2920.

The determining unit 2910 is configured to determine a sounding and sensing related configuration for the serving radio node to be applied in each link of the one or more links based on at least one link related parameter of the link.

The transmitting unit 2920 is configured to transmit the determined sounding and sensing related configuration to the serving radio node.

In an implementation, the at least one link related parameter of the link includes a system load of the serving radio node. As an example, the sounding and sensing related configuration includes a sounding and sensing duration (i.e., DSSI, e.g., as shown in FIG. 8), during which the one or more client radio nodes perform sounding and sensing. In this example, the determining unit 2910 is further configured to determine DSSI based on the system load.

The system load may be evaluated by using, e.g., the average number of links per AP or the average data rate per AP. A DSSI to system load mapping table may be predefined and the control node may semi-statically configure DSSI based on the system load by looking up the table.

According to this implementation, DSSI may be directly proportional to the system load. For instance, a small DSSI may be configured for a low system load case, a medium DSSI may be configured for a medium system load case, and a larger DSSI may be configured for a high system load case. It should be appreciated that "small," "medium" and "larger" occurring here is intended to be used relatively.

As an example, considering system load of an AP serving an office building, which should fall off dramatically during the night or at the weekend, DSSI may be adapted correspondingly in these time periods. For example, the control node may configure a large DSSI for busy hours (high system load) and a small DSSI for low system load hours.

In another implementation, the at least one link related parameter of the link includes statistics on beam switch intervals of the one or more links. As an example, the sounding and sensing related configuration includes a sounding and sensing period (i.e., DSSP, e.g., as shown in FIG. 8). In this example, the determining unit 2910 is further configured to determine DSSP based on the statistics on beam switch intervals.

As an example of this implementation, a beam switch interval of each of the one or more links is dependent on a moving speed of the corresponding client radio node. In this example, the control node 2900 may optionally include a receiving unit 2930. The receiving unit 2930 is configured to receive the moving speed of the corresponding client radio node from the serving radio node.

As a non-limiting example, DSSP may be inversely proportional to the moving speed of the client radio node.

A mapping table between the moving speed and DSSP may be predefined at the control node, which then may look up the table for DSSP according to, e.g., the highest moving speed or the average moving speed of certain ratio of client radio nodes with high moving speed in the system.

It should be noted that two or more different units in this disclosure may be logically or physically combined. For example, the enabling unit 2820 and the disabling unit 2830 may be combined as one single unit. Also, the transmitting unit 2920 and the receiving unit 2930 may be combined as one single unit.

It should be appreciated that the control node 2700 or 2900 may perform the method 700 or 1400, in addition to the method 1900 or 2300. Also, in addition to the method 2100, the serving radio node 2800 may perform the method 900 when serving as a receiving node of a link, may perform the method 1100 when serving as a transmitting node of a link, or may perform the method 1800.

Figure 30:
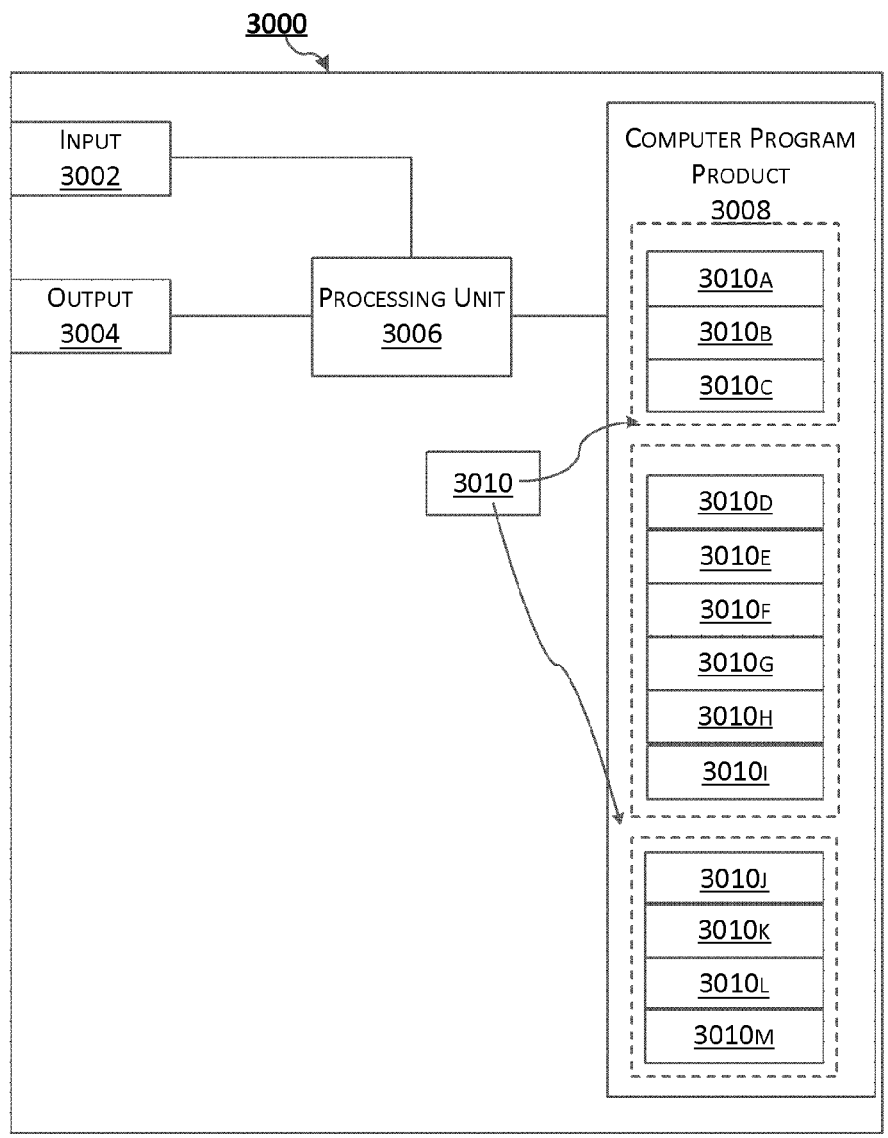
FIG. 30 schematically shows an embodiment of an arrangement 3000 which may be used in the control node 2700, the serving radio node 2800 or the control node 2900 according to the present disclosure.

FIG. 30 schematically shows an embodiment of an arrangement 3000 which may be used in the control node 2700, the serving radio node 2800 or the control node 2900 according to the present disclosure.

Comprised in the arrangement 3000 are here a processing unit 3006, e.g., with a Digital Signal Processor (DSP). The processing unit 3006 may be a single unit or a plurality of units to perform different actions of procedures described herein. The arrangement 3000 may also comprise an input unit 3002 for receiving signals from other entities, and an output unit 3004 for providing signal(s) to other entities. The input unit and the output unit may be arranged as an integrated entity or as illustrated in the example of FIG. 27, 28 or 29.

Furthermore, the arrangement 3000 may comprise at least one computer program product 3008 in the form of a non-volatile or volatile memory, e.g., an Electrically Erasable Programmable Read-Only Memory (EEPROM), a flash memory and a hard drive. The computer program product 3008 comprises a computer program 3010, which comprises code/computer readable instructions, which when executed by the processing unit 3006 in the arrangement 3000 causes the arrangement 3000 and/or the control node or the serving radio node in which it is comprised to perform the actions, e.g., of the procedure described earlier in conjunction with FIG. 19, 21 or 23.

The computer program 3010 may be configured as a computer program code structured in computer program modules 3010A-3010C or 3010D-3010I or 3010J-3010M.

Hence, in an exemplifying embodiment when the arrangement 3000 is used in the control node 2700, the code in the computer program of the arrangement 3000 includes a determining module 3010A, for determining to apply a sounding and sensing related configuration for the serving radio node in each link of the one or more links, if at least one link related parameter of the link satisfies a first predefined condition. The code in the computer program 3010 further includes a transmitting module 30106, for transmitting an enablement signal to the serving radio node. The enablement signal indicates enabling application of the sounding and sensing related configuration in the link. The code in the computer program 3010 may comprise further modules, illustrated as module 3010C, e.g. for controlling and performing other related procedures associated with the control node's operations. For example, when the control node is a CCU, then the module 3010C may control and perform other related procedures associated with the CCU's operations.

In another exemplifying embodiment when the arrangement 3000 is used in the serving radio node 2800, the code in the computer program of the arrangement 3000 includes a receiving module 3010D, for receiving an enablement signal from the control node if at least one link related parameter of the link satisfies a first predefined condition and optionally for receiving a disablement signal from the control node if the at least one link related parameter of the link satisfies a second predefined condition. The enablement signal indicates enabling application of a sounding and sensing related configuration in each of the one or more links. The disablement signal indicates disabling the application of the sounding and sensing related configuration in the link. The code in the computer program further includes an enabling module 3010E, for enabling enable application of the sounding and sensing related configuration in the link based on the enablement signal. The code in the computer program further includes a disabling module 3010F, for disabling application of the sounding and sensing related configuration in the link based on the disablement signal. When the at least one link related parameter of the link includes a geometry related parameter of a client radio node of the link, the code in the computer program further includes an obtaining module 3010G, for obtaining the geometry related parameter, and a transmitting module 3010H, for transmitting the geometry related parameter to the control node. The code in the computer program 3010 may comprise further modules, illustrated as module 3010I, e.g. for controlling and performing other related procedures associated with the serving radio node's operations. For example, when the serving radio node is a BS, then the module 3010I may control and perform other related procedures associated with the BS's operations.

In another exemplifying embodiment when the arrangement 3000 is used in the control node 2900, the code in the computer program of the arrangement 3000 includes a determining module 3010J, for determining a sounding and sensing related configuration for the serving radio node to be applied in each link of the one or more links based on at least one link related parameter of the link. The code in the computer program 3010 further includes a transmitting module 3010K, for transmitting the determined sounding and sensing related configuration to the serving radio node. When the at least one link related parameter of the link includes statistics on beam switch intervals of the one or more links and a beam switch interval of each of the one or more links is dependent on a moving speed of the corresponding client radio node, the code in the computer program 3010 further includes a receiving module 3010L, for receiving the moving speed of the corresponding client radio node from the serving radio node. The code in the computer program 3010 may comprise further modules, illustrated as module 3010M, e.g. for controlling and performing other related procedures associated with the control node's operations. For example, when the control node is a CCU, then the module 3010M may control and perform other related procedures associated with the CCU's operations.

The computer program modules could essentially perform the actions of the flow illustrated in FIG. 19, to emulate the control node 2700, or the actions of the flow illustrated in FIG. 21, to emulate the serving radio node 2800, or the actions of the flow illustrated in FIG. 23, to emulate the control node 2900. In other words, when the different computer program modules are executed in the processing unit 3006, they may correspond, e.g., to the units 2710-2720 of FIG. 27, or to the units 2810-2850 of FIG. 28, or to the units 2910-2930 of FIG. 29.

Furthermore, the computer program 3010 may be further configured as a computer program code structured in computer program modules (not show) for performing the actions of the flow illustrated in FIG. 7, FIG. 9, FIG. 11, FIG. 14, or FIG. 18.

Although the code means in the embodiments disclosed above in conjunction with FIG. 30 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the serving radio node or the control node.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method used in a control node controlling a serving radio node in a wireless communication network, the serving radio node serving one or more client radio nodes which are connected to the serving radio node via one or more links, the method comprising:
   determining, for each link of the one or more links, to apply a sounding and sensing related configuration comprising a sounding and sensing period and a sounding and sensing interval for the serving radio node and a respective client radio node connected via the link, if at least one link related parameter of the link satisfies a first predefined condition; and
   transmitting an enablement signal to the serving radio node, the enablement signal indicating enabling application of the sounding and sensing related configuration in each link having at least one link related parameter satisfying the first predefined condition; and
   receiving one or more sounding and sensing results from the serving radio node for each link satisfying the first predefined condition, wherein the one or more sounding and sensing results are based on measurements on each link between the serving radio node and the one or more client nodes where the sounding and sensing related configuration is enabled; and
   determining inter-link interference on the one or more links based on at least the one or more received sounding and sensing results.

2. The method according to claim 1, further comprising:
   determining not to apply a sounding and sensing related configuration for the serving radio node in the link, if the at least one link related parameter of the link satisfies a second predefined condition; and
   transmitting a disablement signal to the serving radio node, the disablement signal indicating disabling the application of the sounding and sensing related configuration in the link.

3. The method according to claim 2, wherein
the at least one link related parameter of the link includes a geometry related parameter of a client radio node of the link and the second predefined condition is that the geometry related parameter is larger than a first predefined threshold, or
the at least one link related parameter of the link includes a data rate of the link and the second predefined condition is that the data rate is smaller than a second predefined threshold, or
the at least one link related parameter of the link includes a system load of the serving radio node and the second predefined condition is that the system load is smaller than a third predefined threshold, or
the at least one link related parameter of the link includes a victim ratio representing a ratio of links to be interfered among the one or more links, and the second predefined condition is that the victim ratio is smaller than a fourth predefined threshold.

4. The method according to claim 1, wherein the at least one link related parameter of the link includes a geometry related parameter of a client radio node of the link, and the first predefined condition is that the geometry related parameter is smaller than a fifth predefined threshold.

5. The method according to claim 4, wherein the geometry related parameter is based on a discovery signal strength and/or quality of the serving radio node or a difference between the discovery signal strength and/or quality of the serving radio node and that of the strongest neighboring radio node.

6. The method according to claim 1, wherein the at least one link related parameter of the link includes a data rate of the link, and the first predefined condition is that the data rate of the link is larger than a sixth predefined threshold.

7. The method according to claim 1, wherein the at least one link related parameter of the link includes a system load of the serving radio node and the first predefined condition is that the system load is higher than a seventh predefined threshold.

8. The method according to claim 1, wherein the at least one link related parameter of the link includes a victim ratio representing a ratio of links to be interfered among the one or more links, and the first predefined condition is that the victim ratio is larger than an eighth predefined threshold.

9. The method according to claim 8, wherein each of the links to be interfered has a link SINR (Signal and Interference to Noise Ratio) lower than a predefined SINR threshold.

10. A method used in a serving radio node under control of a control node in a wireless communication network, the serving radio node serving one or more client radio nodes which are connected to the serving radio node via one or more links, the method comprising:
receiving, from the control node, an enablement signal indicating enabling application of a sounding and sensing related configuration comprising a sounding and sensing period and a sounding and sensing interval, for each link of the one or more links, if at least one link related parameter of the link satisfies a first predefined condition; and
enabling application of the sounding and sensing related configuration in each link between the serving radio node and a respective client radio node of the one or more client radio nodes, based on the enablement signal indicating the link has at least one link related parameter satisfying the first predefined condition; and
reporting one or more sounding and sensing results to the control node, wherein the one or more sounding and sensing results are based on measurements on each link between the serving radio node and the one or more client nodes where the sounding and sensing related configuration is enabled.

11. The method according to claim 10, further comprising:
receiving, from the control node, a disablement signal indicating disabling the application of the sounding and sensing related configuration in the link, if the at least one link related parameter of the link satisfies a second predefined condition; and
disabling application of the sounding and sensing related configuration in the link based on the disablement signal.

12. The method according to claim 11, wherein
the at least one link related parameter of the link includes a geometry related parameter of a client radio node of the link and the second predefined condition is that the geometry related parameter is larger than a first predefined threshold, or
the at least one link related parameter of the link includes a data rate of the link and the second predefined condition is that the data rate is smaller than a second predefined threshold, or
the at least one link related parameter of the link includes a system load of the serving radio node and the second predefined condition is that the system load is smaller than a third predefined threshold, or
the at least one link related parameter of the link includes a victim ratio representing a ratio of links to be interfered among the one or more links, and the second predefined condition is that the victim ratio is smaller than a fourth predefined threshold.

13. The method according to claim 10, wherein the at least one link related parameter of the link includes a geometry related parameter of a client radio node of the link, and the first predefined condition is that the geometry related parameter is smaller than a fifth predefined threshold.

14. The method according to claim 13, wherein the geometry related parameter is based on a discovery signal strength and/or quality of the serving radio node or a difference between the discovery signal strength and/or quality of the serving radio node and that of the strongest neighboring radio node.

15. The method according to claim 13, further comprising:
obtaining the geometry related parameter; and
transmitting the geometry related parameter to the control node.

16. The method according to claim 10, wherein the at least one link related parameter of the link includes a data rate of the link, and the first predefined condition is that the data rate of the link is larger than a sixth predefined threshold.

17. The method according to claim 10, wherein the at least one link related parameter of the link includes a system load of the serving radio node and the first predefined condition is that the system load is higher than a seventh predefined threshold.

18. The method according to claim 10, wherein the at least one link related parameter of the link includes a victim ratio representing a ratio of links to be interfered among the one or more links, and the first predefined condition is that the victim ratio is larger than an eighth predefined threshold.

19. The method according to claim 18, wherein each of the links to be interfered has a link SINR (Signal and Interference to Noise Ratio) lower than a predefined SINR threshold.

20. A method used in a control node controlling a serving radio node in a wireless communication network, the serving radio node serving one or more client radio nodes which are connected to the serving radio node via one or more links, the method comprising:
- determining a sounding and sensing related configuration comprising a sounding and sensing period and a sounding and sensing interval for the serving radio node to be applied in each link of the one or more links based on at least one link related parameter of the link; and
- transmitting the determined sounding and sensing related configuration to the serving radio node; and
- receiving one or more sounding and sensing results from the serving radio node, wherein the sounding and sensing results are based on measurements at the serving radio node on each link between the serving radio node and the one or more client radio nodes on which the transmitted sounding and sensing related configuration is applied; and
- determining an inter-link interference map based on at least the one or more received sounding and sensing results.

21. The method according to claim 20, wherein the at least one link related parameter of the link includes a system load of the serving radio node.

22. The method according to claim 21, wherein the sounding and sensing related configuration includes a sounding and sensing duration, during which the one or more client radio nodes perform sounding and sensing, and said determining a sounding and sensing related configuration comprises: determining the sounding and sensing duration based on the system load.

23. The method according to claim 20, wherein the at least one link related parameter of the link includes statistics on beam switch intervals of the one or more links.

24. The method according to claim 23, wherein the sounding and sensing related configuration includes a sounding and sensing period, and said determining a sounding and sensing related configuration comprises: determining the sounding and sensing period based on the statistics on beam switch intervals.

25. The method according to claim 23, wherein a beam switch interval of each of the one or more links is dependent on a moving speed of the corresponding client radio node.

26. The method according to claim 25, further comprising:
- receiving the moving speed of the corresponding client radio node from the serving radio node.

* * * * *